US010167937B2

(12) United States Patent
Crosby et al.

(10) Patent No.: US 10,167,937 B2
(45) Date of Patent: Jan. 1, 2019

(54) MODULAR HYDROSTATIC TRANSMISSION

(71) Applicant: Parker-Hannifin Corporation, Cleveland, OH (US)

(72) Inventors: Michael Tholan Crosby, Jonesborough, TN (US); Matthew Herman Simon, Paw Paw, MI (US); David Mark Heathcoat, Greeneville, SC (US); Jason Scot Richardson, Chuckey, TN (US); John Matthew Rector, Jonesboro, TN (US); Raymond E. Collett, Put-in-Bay, OH (US); Somer Renee Malone, Chuckey, TN (US)

(73) Assignee: Parker-Hannifin Corporation, Cleveland, OH (US)

( * ) Notice: Subject to any disclaimer, the term of this patent is extended or adjusted under 35 U.S.C. 154(b) by 226 days.

(21) Appl. No.: 14/765,686

(22) PCT Filed: Feb. 14, 2014

(86) PCT No.: PCT/US2014/016353
§ 371 (c)(1),
(2) Date: Aug. 4, 2015

(87) PCT Pub. No.: WO2014/127182
PCT Pub. Date: Aug. 21, 2014

(65) Prior Publication Data
US 2016/0003336 A1 Jan. 7, 2016

Related U.S. Application Data

(60) Provisional application No. 61/765,172, filed on Feb. 15, 2013.

(51) Int. Cl.
*F16H 39/00* (2006.01)
*B60K 17/00* (2006.01)
(Continued)

(52) U.S. Cl.
CPC ............ *F16H 47/04* (2013.01); *F15B 11/028* (2013.01); *F16H 39/12* (2013.01); *B60Y 2200/223* (2013.01); *B60Y 2304/01* (2013.01)

(58) Field of Classification Search
CPC .......... F16H 39/08; F16H 39/14; F16H 39/16; F16H 61/4043; F16H 61/4157; B60K 17/105; B60Y 2200/223; B60Y 2304/01
(Continued)

(56) References Cited

U.S. PATENT DOCUMENTS 4,199,305 A * 4/1980 Pareja ..................... F04C 14/26
417/440
5,339,631 A * 8/1994 Ohashi ................. B60K 17/105
60/487

(Continued)

FOREIGN PATENT DOCUMENTS

EP 1286086 A2 2/2003

OTHER PUBLICATIONS

International Search report and Written Opinion for corresponding International Application No. PCT/US2014/016353, dated Apr. 9, 2014.

(Continued)

Primary Examiner — Michael Leslie
Assistant Examiner — Dustin T Nguyen
(74) Attorney, Agent, or Firm — Renner, Otto, Boisselle & Sklar, LLP

(57) ABSTRACT

A center section/motor sub-assembly for use in a hydrostatic transmission includes a center section having a pump running face for interfacing with a pump, and a motor running face for interfacing with a motor. The center section and the motor are configured for the hydraulic separating forces of the motor to be reacted only into the center section. The center section has two internal passages between pump (Continued)

kidney ports and motor kidney port, and the motor kidney ports are raised in elevation relative to the pump kidney ports. The internal passages run parallel to each other as they rise in elevation. A hydrostatic transmission includes the sub-assembly enclosed by a housing, in combination with a pump and output shaft assembly. For installation, the output shaft assembly is configured as a separate component from the sub-assembly of the center section and the motor.

23 Claims, 29 Drawing Sheets

(51) Int. Cl.
  *F16H 47/04* (2006.01)
  *F16H 39/12* (2006.01)
  *F15B 11/028* (2006.01)
(58) Field of Classification Search
  USPC .................................................. 60/464, 487
  See application file for complete search history.

(56) References Cited

U.S. PATENT DOCUMENTS

| | | | |
|---|---|---|---|
| 5,816,034 A | 10/1998 | Peter | |
| 6,260,339 B1 * | 7/2001 | Abend | A01D 34/6806 56/14.7 |
| 6,779,615 B2 † | 8/2004 | Boyer | |
| 6,986,406 B1 † | 1/2006 | Hauser | |
| 7,328,576 B1 | 2/2008 | Langenfeld et al. | |
| 7,383,683 B1 | 6/2008 | Rawski | |
| 7,458,311 B2 † | 12/2008 | Korthals | |
| 7,510,035 B1 * | 3/2009 | Irikura | B60K 17/105 180/6.3 |
| 7,546,731 B2 † | 6/2009 | Abend | |
| 7,739,870 B2 † | 6/2010 | Carlson | |
| 8,545,367 B2 † | 10/2013 | Hartz | |
| 2002/0088223 A1 * | 7/2002 | Abend | B60B 35/007 60/487 |
| 2002/0104314 A1 | 8/2002 | Johnson et al. | |
| 2003/0070429 A1 † | 4/2003 | Jolliff | |
| 2004/0011195 A1 * | 1/2004 | Okada | F04B 1/324 92/12.2 |
| 2011/0192158 A1 † | 8/2011 | Simon | |

OTHER PUBLICATIONS

Preliminary Report on Patentability for corresponding International Application No. PCT/US2014/016353, dated May 18, 2015.

\* cited by examiner
† cited by third party

MODULAR HYDROSTATIC TRANSMISSION

RELATED APPLICATIONS

This application is a national phase of International Application No. PCT/US2014/016353 filed Feb. 14, 2014 and published in the English language.

FIELD OF INVENTION

The present invention relates generally to hydraulic pumps and motors, and more particularly to a hydrostatic transmission having a pump, a motor, and a center section that provides a fluid connection between the pump and motor for the flow of hydraulic fluid.

BACKGROUND

A prime mover, such as an internal combustion engine or the like, can be connected to a high speed, low torque hydrostatic transmission that may be directly mounted to a mechanical speed reduction device, such as a gearbox. A hydrostatic transmission is particularly suitable to provide traction drive for a light vehicle, such as turf machines, lawn tractors, ride-on lawn mowers, and like devices. A hydrostatic transmission may be connected to a variety of gearboxes and transaxles, so the same components can be utilized on a wide variety of light vehicle models. A simple usage of hydrostatic transmissions is on zero-turn radius vehicles, including zero-turn radius mowers and tractors.

Generally, a hydrostatic transmission includes a hydraulic pump and a hydraulic motor. The hydraulic pump usually is a piston-type pump including a plurality of reciprocating pistons which are in fluid communication through hydraulic porting with the hydraulic motor. Rotation of the hydraulic pump against a moveable swash plate creates an axial motion of the pump pistons that forces hydraulic fluid through the hydraulic porting to the hydraulic motor to drive the motor, which allows the transmission output speed to be varied and controlled. The rotation of the hydraulic motor may be used to drive an output shaft, which in turn ultimately drives a wheel axle of a light vehicle of the types described above.

Because of the size constraints associated with light vehicles, it has been difficult to provide a combined hydrostatic transmission and gearbox assembly that is compact, cost effective, and easy to assemble. Current solutions for combining hydrostatic transmissions with gearboxes incorporate such components into an integrated housing rather than as modular components. As a result of such non-modular configurations, there is typically no ability to interchange the hydrostatic transmission with different configurations of gearbox components, which would be desirable to provide flexibility of usage with different types of light vehicle configurations.

SUMMARY OF INVENTION

A need exists for an improved hydrostatic transmission that overcomes one or more of the above deficiencies of conventional configurations. A center section/motor sub-assembly for a hydrostatic transmission includes an enhanced center section combined with a motor. The center section orients a pump running face 90° relative to a motor running face, and in a manner in which the hydraulic separating forces of the motor are reacted only in the center section, and not in a top housing that encloses the sub-assembly. A hydrostatic transmission includes the center section/motor sub-assembly enclosed by the top housing. The hydrostatic transmission further may include an output shaft assembly that is separately installed and extends through a bore in the top housing. The configuration of the present invention enhances the ease of manufacture of the center section, particularly using conventional sand-casting processes that are known in the art.

An aspect of the invention is a center section/motor sub-assembly for use in a hydrostatic transmission. The sub-assembly includes a center section having a pump running face for interfacing with a pump, and a motor running face for interfacing with a motor. The pump running face and the motor running face are oriented at 90° relative to each other. The motor has a motor housing that encloses a rotor set that may include an inner rotor and an outer rotor, and the motor housing is secured to the center section against the motor running face in a manner that permits rotation of the rotor set. The center section and the motor are configured for the hydraulic separating forces of the motor to be reacted only into the center section. The center section forms a porting manifold for communicating hydraulic fluid from the pump to the motor. The porting manifold may include at least two internal passages between pump kidney ports on the pump running face and motor kidney ports on the motor running face, and the motor kidney ports may be raised in elevation relative to the pump kidney ports. The internal passages may run parallel to each other as they rise in elevation between the pump kidney ports and the motor.

Another aspect of the invention is a hydrostatic transmission including the center section/motor sub-assembly, a pump, and a top housing that encloses the center section, pump, and motor. The center section and the motor are configured for the hydraulic separating forces of the motor to be reacted only into the center section, and not the top housing. The hydrostatic transmission may be incorporated into light vehicles, such as for example, turf machines, lawn tractors, ride-on lawn mowers, and like devices, including zero-turn radius vehicles.

In exemplary embodiments, the hydrostatic transmission further may include an output shaft assembly that extends through a bore in the top housing. The output shaft assembly may include an output shaft having a first end that is positioned adjacent to the rotor set of the motor, and a second end opposite the first end that extends outward from the top housing. The first end of the output shaft is supported by bearings in the motor housing and the center section. The second end in particular may extend through a bore in the top housing, which is sealed using a shaft seal. The overall configuration of the hydrostatic transmission may be made more compact when the output shaft assembly is installed through the bore in the top housing after the center section/motor sub-assembly is installed in the top housing. Torque may be transmitted from the motor to the output shaft by means of a key, in which case the key may be secured to the shaft by means of a low-profile retaining ring during installation.

In exemplary embodiments, the top housing of the hydrostatic transmission may enclose a fluid reservoir. The volume enclosed by the top housing is sufficient to define an internal expansion volume into which the fluid in the reservoir can expand. This eliminates the need for a separate, external expansion tank installed on the hydrostatic transmission as is utilized in conventional configurations.

Another aspect of the invention is a dual hydrostatic transmission system including a first hydrostatic transmission attached to a first gearbox unit, and a second hydrostatic transmission attached to a second gearbox unit. A drive belt connects the first hydrostatic transmission and the second hydrostatic transmission to a prime mover, such as an internal combustion engine. In exemplary embodiments of the dual hydrostatic transmission system, the first hydrostatic transmission is a right side hydrostatic transmission, and the second hydrostatic transmission is a left side hydrostatic transmission. The right side hydrostatic transmission and the left side hydrostatic transmission may have configurations that are substantially mirror images of each other. The center section of the right side hydrostatic transmission may be mirror imaged and rotated 180° about horizontal and vertical axes relative to the center section of the left side hydrostatic transmission. The motor of the right side hydrostatic transmission may have a common configuration with the motor of the left side hydrostatic transmission. The dual hydrostatic transmission system may be incorporated into any suitable light vehicle, such as for example turf machines, lawn tractors, ride-on lawn mowers, and like devices, including zero-turn radius devices.

Another aspect of the invention is a modular hydrostatic transaxle system including a hydrostatic transmission attached to transaxle including a differential gearing system and an axle shaft. The hydrostatic transmission drives the differential gearing system to drive the axle shaft.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Figure 1:
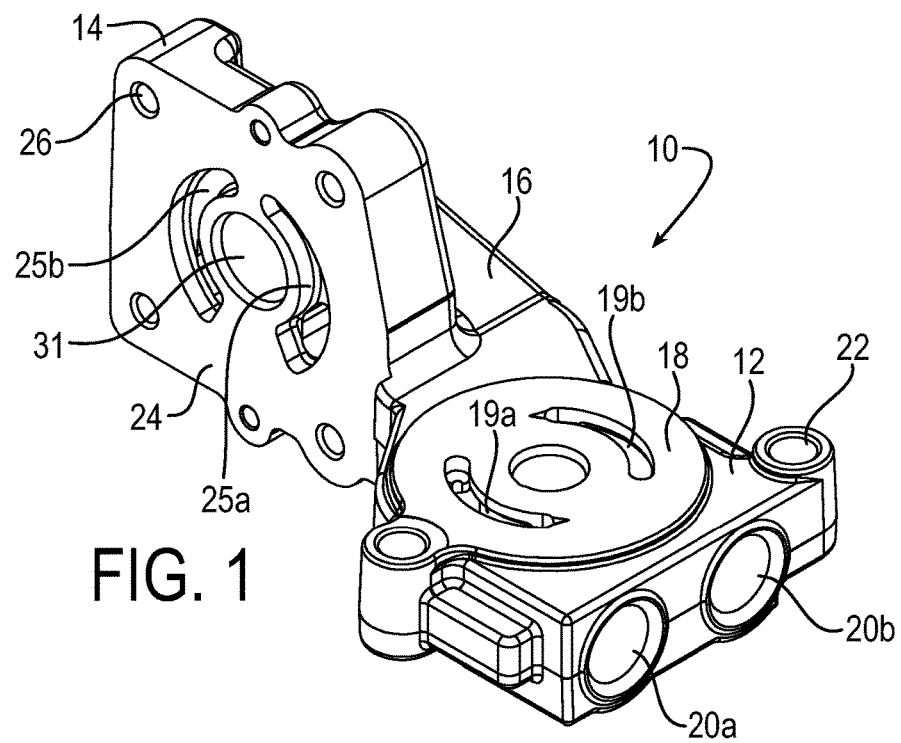
FIG. 1 is a drawing depicting a perspective view of an exemplary right side center section of a hydrostatic transmission in accordance with embodiments of the present invention.

Embodiments of the present invention will now be described with reference to the drawings, wherein like reference numerals are used to refer to like elements throughout. It will be understood that the figures are not necessarily to scale.

In some light vehicle configurations, there are at least a first or right side transmission that drives the right side wheel, and a second or left side transmission that drives the left side wheel. Such dual hydrostatic transmission systems are particularly suitable for zero-turn radius mowers and lawn tractors. In an alternative light vehicle configuration, a modular hydrostatic transaxle system includes a single hydrostatic transmission attached to a transaxle including a differential gearing system and an axle shaft. In either configuration, the vehicle wheels are driven via a gear reduction system that is driven by the one or dual hydrostatic transmissions.

A dual hydrostatic transmission system is described first. As further detailed below, the right side and left side transmissions have comparable components, although the precise configuration of the components relative to each other may differ because of the differing relative position of the right side wheel relative to the right side transmission, versus the position of the left side wheel relative to the left side transmission. In particular, again as further detailed below, certain components may be flipped and/or mirror imaged to accommodate the right side wheel versus the left side wheel, although the components on both sides generally are comparable. For convenience, a right side transmission first will be described.

Figure 2:
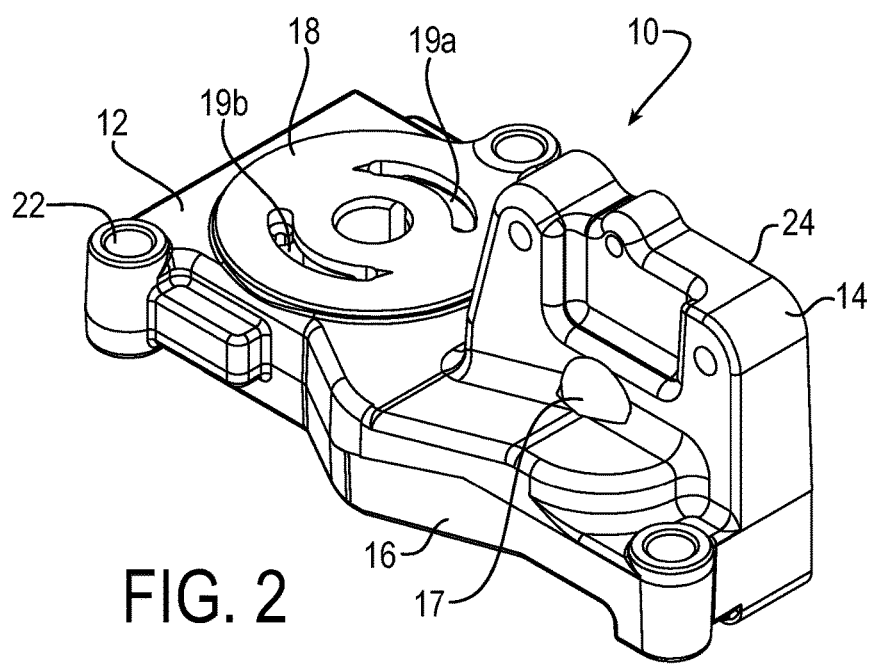
FIG. 2 is a drawing depicting a second perspective view of the exemplary right side center section.

As a component of a hydrostatic transmission, an enhanced center section provides a fluid connection between a pump and a motor within the hydrostatic transmission. FIGS. 1 and 2 are drawings depicting two perspective views from different viewpoints of an exemplary right side center section 10 for use in a hydrostatic transmission. The center section 10 includes a pump interfacing portion 12 and a motor connection portion 14. The pump interfacing portion and motor connection portion form a porting manifold 16 including internal passages for communicating hydraulic fluid between a pump and a motor (the pump and motor are not shown in FIGS. 1-2). The pump interfacing portion 12 includes a pump running face 18 that interfaces with the pump components. As further described below, the pump includes a piston-containing barrel that rotates adjacent to the pump running face 18. The pump, therefore, interfaces directly with the center section at the pump running face. Valve cavities 20a and 20b provide for entry of hydraulic fluid into the center section, which is controlled by check valves (not shown in FIGS. 1 and 2) positioned within the valve cavities. Fastening receivers 22 receive fastening elements to secure the center section components within a hydrostatic transmission housing, as further explained below. The motor connection portion 14 includes a motor running face 24 which acts as an interface between the motor components and the center section. Motor fastening receivers 26 receive fastening elements that secure a motor housing in a manner that positions rotating rotor elements of the motor adjacent to the motor running face 24.

As seen in FIG. 1, a center section bore hole 31 is provided that supports an end of an output shaft that extends into the center section. As seen particularly in FIG. 2, the creation of the bore hole 31 during the casting process also forms a bleed hole 17. The bleed hole prevents pressure from building behind the output shaft. If pressure builds up behind the output shaft, it can create an outboard thrust load that will significantly reduce the life of the output shaft bearing, so the bleed hole allows the use of a smaller, more economical bearing, improving economy and reducing package size. Because the bleed hole 17 is formed at the same time as the bore hole 31, cycle time is reduced and there is no need to perform a separate operation to form the bleed hole as is conventional.

For fluid communication, the pump interfacing portion 12 includes pump kidney ports 19a and 19b that extend through the pump running face 18. The pump kidney ports provide a fluid connection with the pump for the flow of hydraulic fluid. In operation, the pump provides flow to port 19a for driving the motor in the forward direction (clockwise rotation of the transmission output shaft when looking at the output shaft). The pump provides flow to port 19b for driving the motor in the reverse direction (counterclockwise rotation of the transmission output shaft when looking at the output shaft). Commensurately, the motor connection portion 14 includes motor kidney ports 25a and 25b that extend through the motor running face 24. Port 25a is in fluid communication with port 19a, and port 25b is in fluid communication with port 19b.

Figure 3:
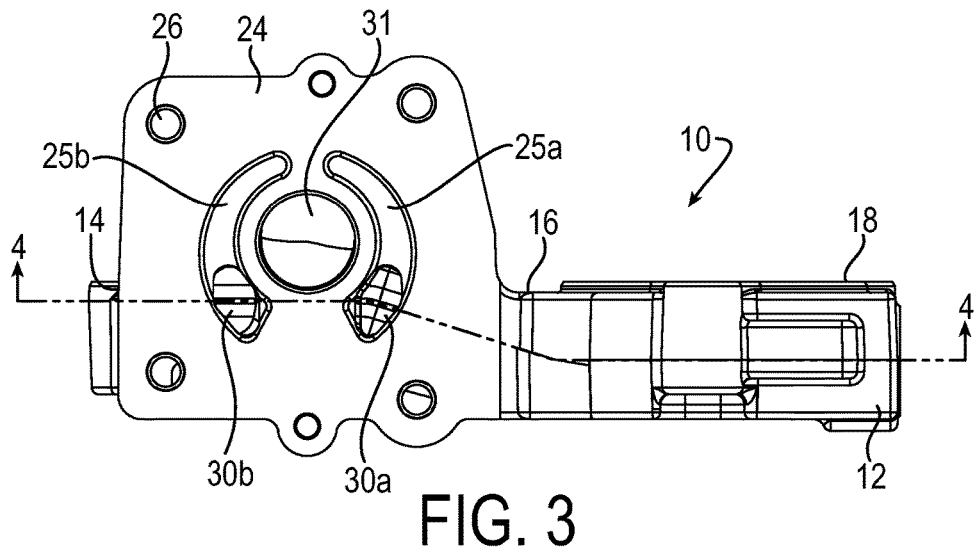
FIG. 3 is a drawing depicting a side view on the motor facing side of the exemplary right side center section.
Figure 4:
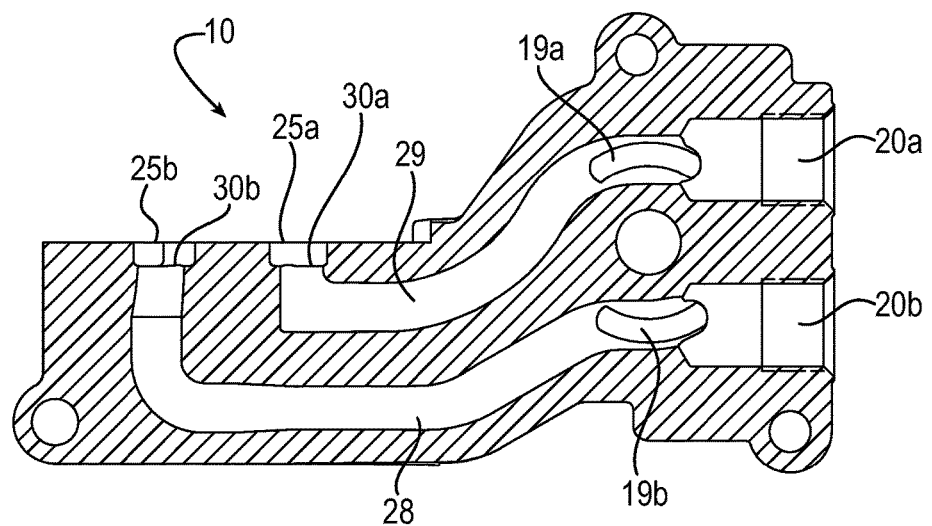
FIG. 4 is a drawing depicting a cross-sectional view of the right side center section along the line 4-4 of FIG. 3.

FIG. 3 is a drawing depicting a side view on the motor facing side of the exemplary right side center section. The motor kidney ports 25a and 25b provide a fluid connection with outlet ports 30a and 30b for the flow of hydraulic fluid. FIG. 3 also is utilized as a reference figure for generating a cross-sectional view of the center section 10. FIG. 4 is a drawing depicting a cross-sectional view of the center section along the line 4-4 of FIG. 3.

Referring to FIG. 4, the center section 10 includes first and second internal passages 28 and 29 for communicating the hydraulic fluid from the pump kidney ports to the motor kidney ports on the motor connection portion, which end in the outlet ports 30a and 30b. Thus, the motor connection portion 14 includes motor kidney ports 25a/b that extend through the motor running face 24 to the outlet ports 30a and 30b. The motor kidney ports provide fluid connection with the motor for the flow of hydraulic fluid. In this manner, the pump kidney ports are connected to the outlet ports via the internal passages 28 and 29. Check valves (not shown in FIGS. 3-4) may be installed in the valve cavities 20a and 20b of the pump interfacing portion to control fluid flow from a source of hydraulic fluid into the hydrostatic transmission.

As shown further shown in FIGS. 3-4, the fluid flow angle changes as the fluid flows from the pump connection side to the motor connection side. In particular, the motor and outlet ports 30a and 30b are raised slightly above the valve cavities 20a and 20b. As seen particularly in FIG. 4, the internal passages 28 and 29 are configured substantially parallel to each other, as they rise in elevation between the pump and the motor to where the motor kidneys are relatively wide. The described configuration improves manufacturability of the sand cores used to form the center section casting, and generally renders manufacturing more easy particularly with conventional sand casting processes.

Figure 5:
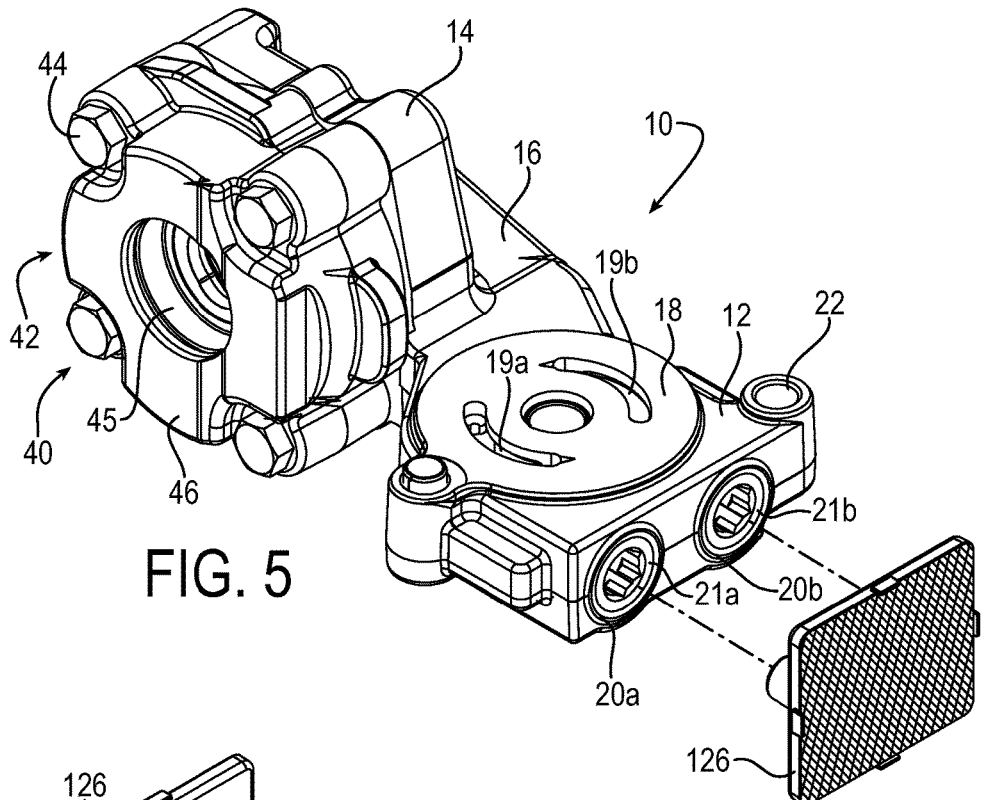
FIG. 5 is a drawing depicting a perspective view of an exemplary right side center section/motor portion sub-assembly of a hydrostatic transmission in accordance with embodiments of the present invention.
Figure 6:
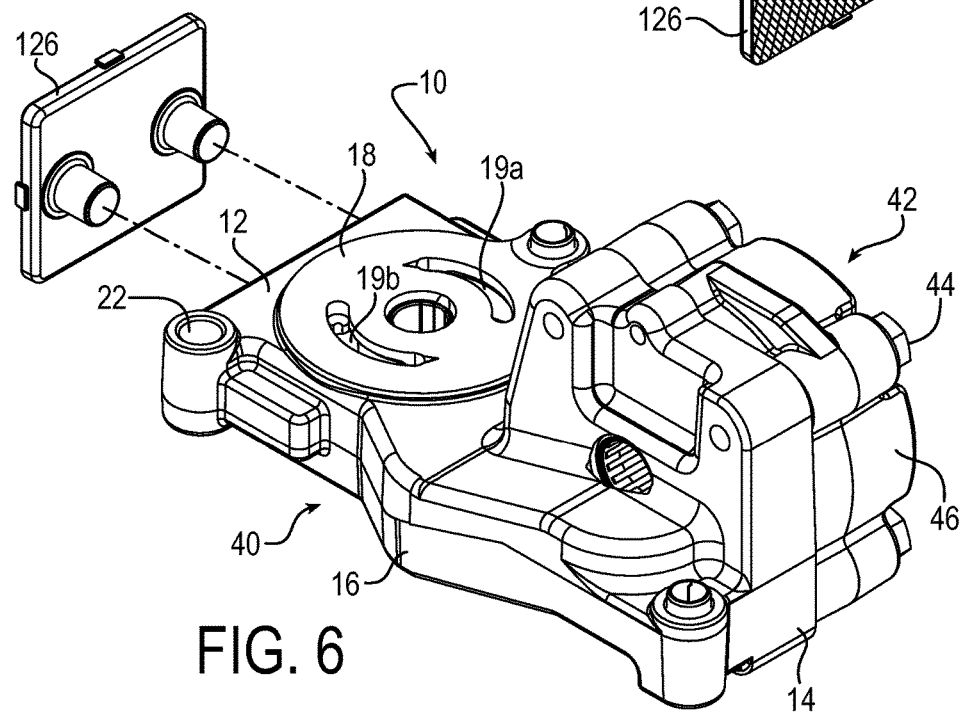
FIG. 6 is a drawing depicting a second perspective view of the exemplary right side center section/motor portion sub-assembly.

The center section can be combined with a motor portion to form an integrated sub-assembly. In the disclosed configuration, all of the hydraulic separating forces from the motor are directly reacted into the center section 10 only, as opposed to such forces being transferred to the top housing of the transmission and related housing components. FIGS. 5 and 6 are drawings depicting two perspective views from different viewpoints of an exemplary right side center section/motor portion sub-assembly 40 for use in a hydrostatic transmission.

Because the center section/motor portion sub-assembly 40 includes the center section 10 described above, like components of FIGS. 5 and 6 are numbered the same as in FIGS. 1-4.

Referring to FIGS. 5 and 6, the sub-assembly 40 includes the center section 10 and a motor portion 42. The motor portion 42 has a housing 46 that encloses a rotor set. The motor portion 42 may be a high speed, low torque motor with a gerotor configuration in which the rotor set includes an inner rotor and an outer rotor enclosed within the motor housing 46. Because the inner and outer rotor elements are enclosed by the housing 46, they are not visible in FIGS. 5 and 6. The motor portion drives an output shaft, as described in more detail below. The motor housing 46 further includes a motor bearing bore 45 that supports the output shaft in combination with the center section bearing bore 31 referenced above. The motor housing 46 is secured to the center section 10 against the motor running face 24 (now covered by the motor in these figures) in a manner that permits rotation of the internal rotor set. In particular, the motor housing 46 may be secured against the motor running face using fastening elements 44 that are received in the motor fastening receivers 26 referenced above.

FIG. 5 further depicts check valves 21*a* and 21*b*, as located in the valve cavities 20*a* and 20*b*. A filter 126 may be engaged within the center section by any suitable means. In an exemplary embodiment, the filter 126 may be a press-in filter that is pressed into cylindrical bores inside the check valves 21*a* and 21*b*.

As referenced above, this portion of the description pertains to a type of light vehicle configuration that has a first or right side hydrostatic transmission that drives the right side wheel, and a second or left side hydrostatic transmission that drives the left side wheel. The right side and left side hydrostatic transmissions have comparable components, although the precise configuration of the components relative to each other may be flipped or rotated because of the differing relative position of the right side wheel relative to the right side hydrostatic transmission, versus the position of the left side wheel relative to the left side hydrostatic transmission.

FIGS. 7-12 are drawings depicting left side center section and motor components for a left side hydrostatic transmission that may be used in a dual hydrostatic transmission system. Because the various components are comparable on both the right and left sides, for the left side "prime" designations are added to comparable reference numerals for the corresponding right side components (e.g., left center section 10', left pump interfacing portion 12', left motor connection portion 14', left connection section/motor portion sub-assembly 40', etc.) Accordingly, the various figures are identified below, but for convenience duplicative descriptions of comparable components are not provided to the extent the above right side description applies.

Figure 7:
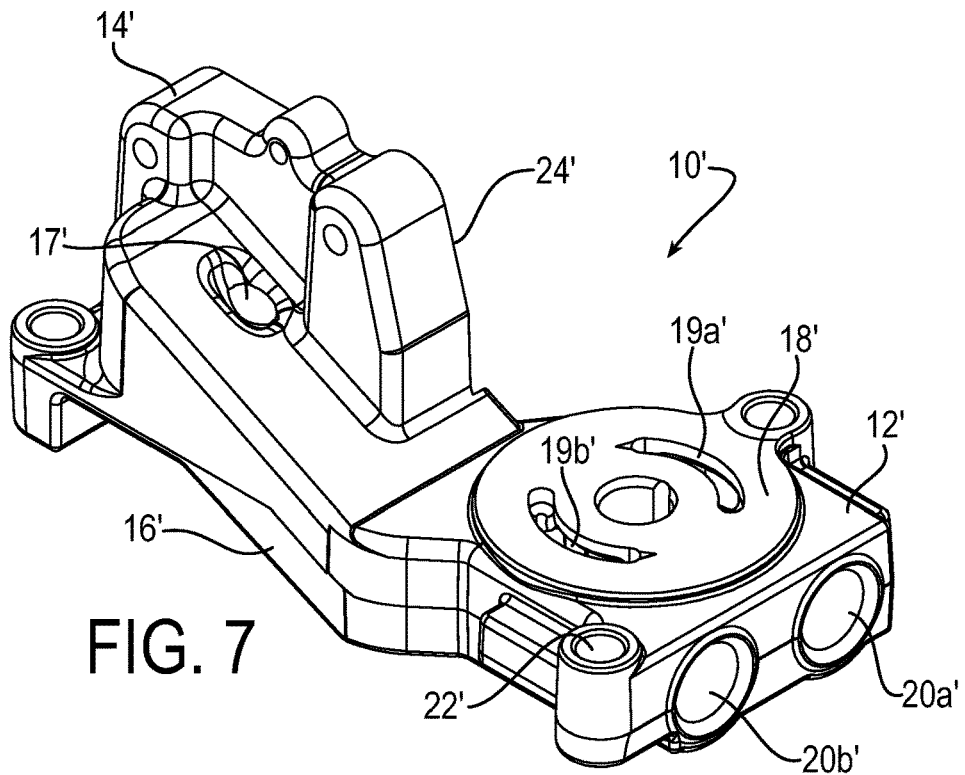
FIG. 7 is a drawing depicting a perspective view of an exemplary left side center section of a hydrostatic transmission in accordance with embodiments of the present invention.
Figure 8:
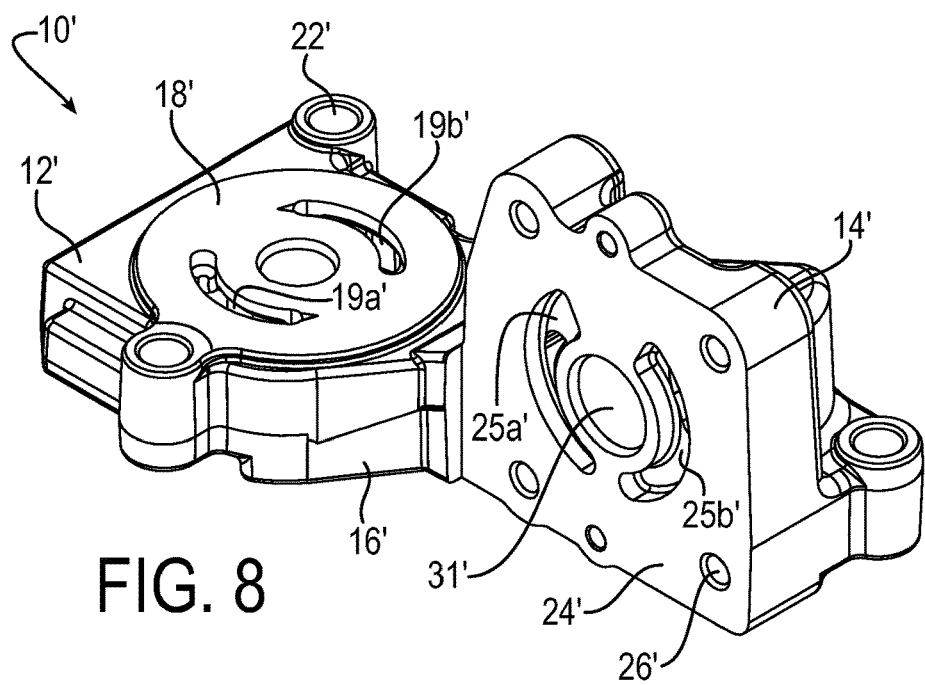
FIG. 8 is a drawing depicting a second perspective view of the exemplary left side center section.
Figure 9:
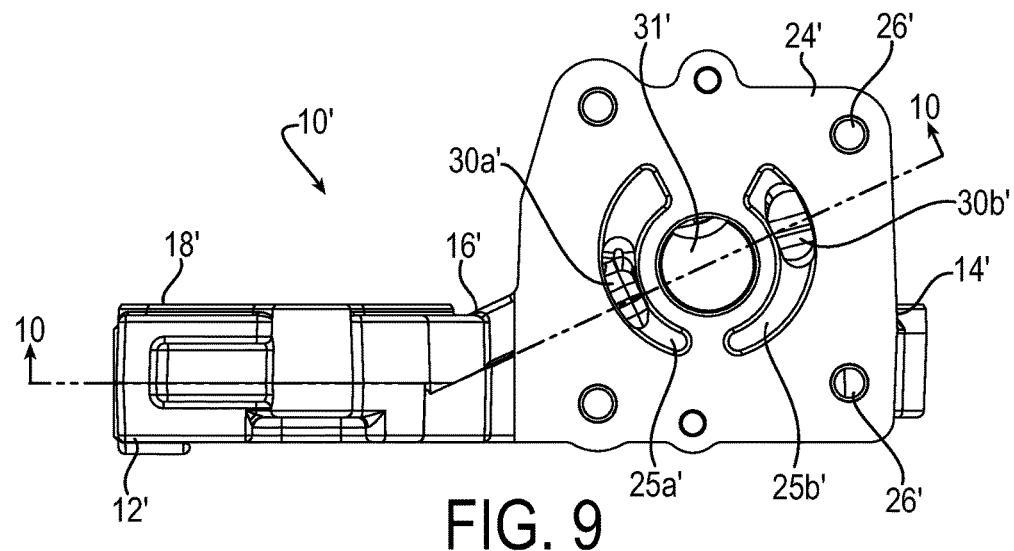
FIG. 9 is a drawing depicting a side view on the motor facing side of the exemplary left side center section.

FIGS. 7 and 8 are drawings depicting two perspective views from different viewpoints of an exemplary left side center section 10' for use in a hydrostatic transmission. FIG. 9 is a drawing depicting a side view on the motor facing side of the exemplary left side center section. FIG. 9 is utilized as a reference figure for generating a cross-sectional view of the left side center section 10'. In particular, FIG. 10 is a drawing depicting a cross-sectional view of the left side center section along the line 10-10 of FIG. 9.

Comparing the right side figures to the left side figures, the center section motor porting is re-configured for the left versus right sides (and vice versa) by flipping the orientation of the motor running faces 24 (right) and 24' (left), which corresponds to a commensurate change in the connection orientation to the motor kidneys and motor housing. The flipping includes mirror imaging and a 180° rotation about a vertical axis of the center section, and 180° rotation about a horizontal axis of the center section. This permits a motor potion 42' to be used on the left side that is comparable to the motor portion 42 on the right side, but flipped over about the horizontal axis. Accordingly, there is part commonality as between the motor portions on the left and right sides.

Figure 10:
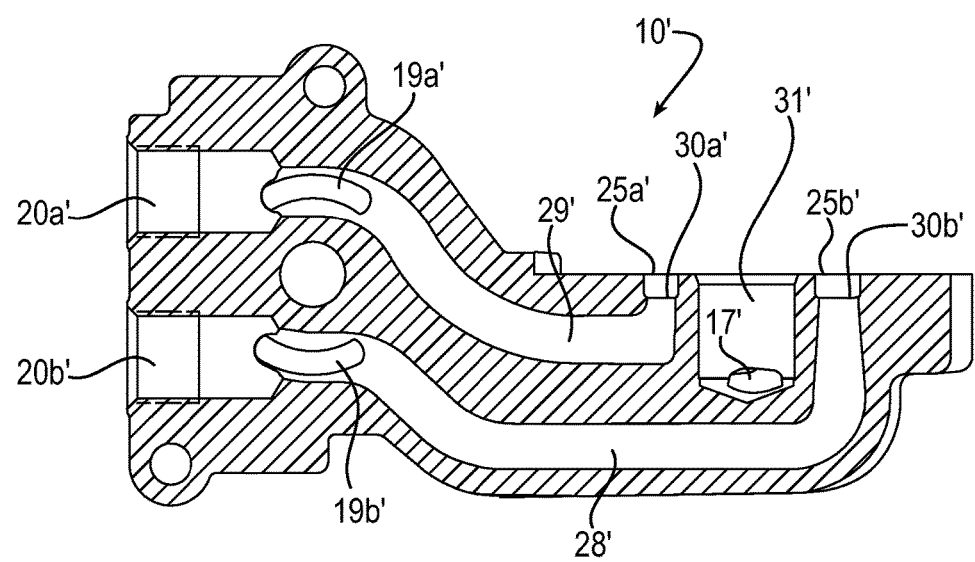
FIG. 10 is a drawing depicting a cross-sectional view of the left side center section along the line 10-10 of FIG. 9.

As seen in FIGS. 9 and 10, similarly to the right side, the fluid flow angle changes as the fluid flows from the pump connection side to the motor connection side. In particular, the outlet ports 30*a'* and 30*b'* are raised or slightly above the valve cavities 20*a'* and 20*b'*. FIG. 10 shows that, similarly to the right side, the left side internal passages 28' and 29' are configured substantially parallel to each other, as they rise in elevation between the pump and the motor to where the motor kidneys are relatively wide. On the left side, in contrast to the right side, the fluid flow passages extend adjacent to and on opposite sides of a left side center section bearing bore 31'. The configuration of the internal passages permits, on the left side in particular, routing of the hydraulic fluid flow around the center section bearing bore 31'. The configuration provides for the necessary wall thickness for both fluid passages 28' and 29', while providing the desired connection with the motor portion 42', which produces the desired relationship between the control arm rotation and motor output shaft rotation.

Figure 11:
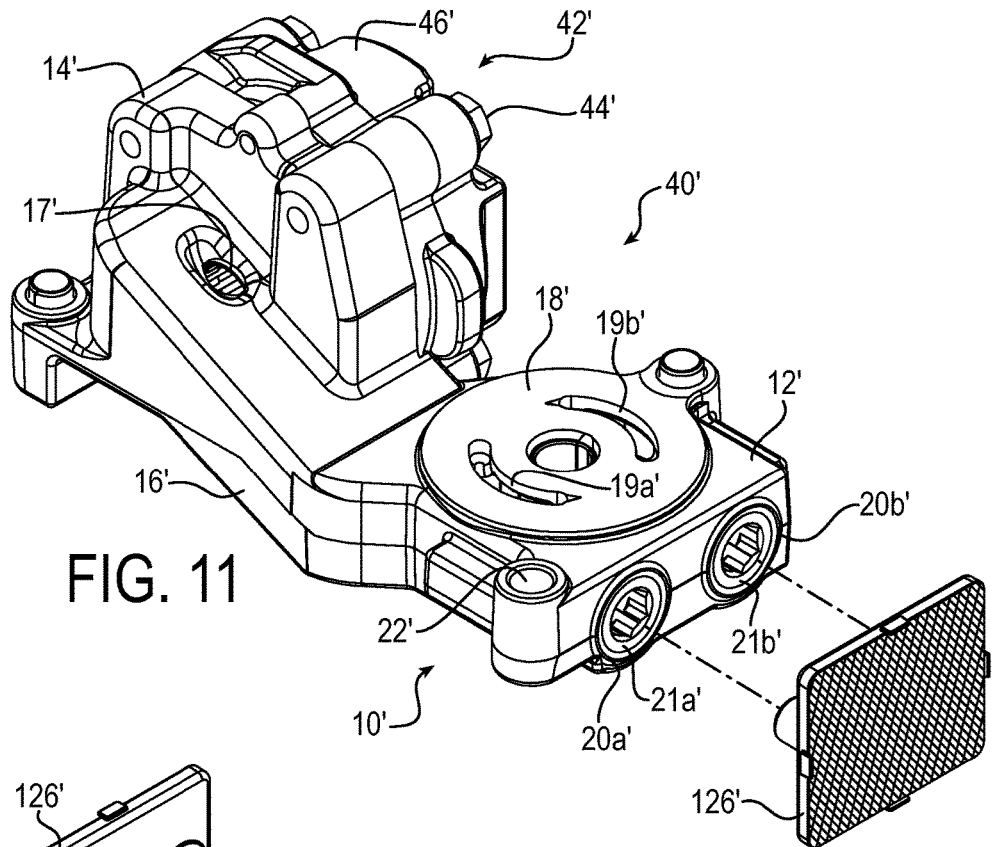
FIG. 11 is a drawing depicting a perspective view of an exemplary left side center section/motor portion sub-assembly of a hydrostatic transmission in accordance with embodiments of the present invention.
Figure 12:
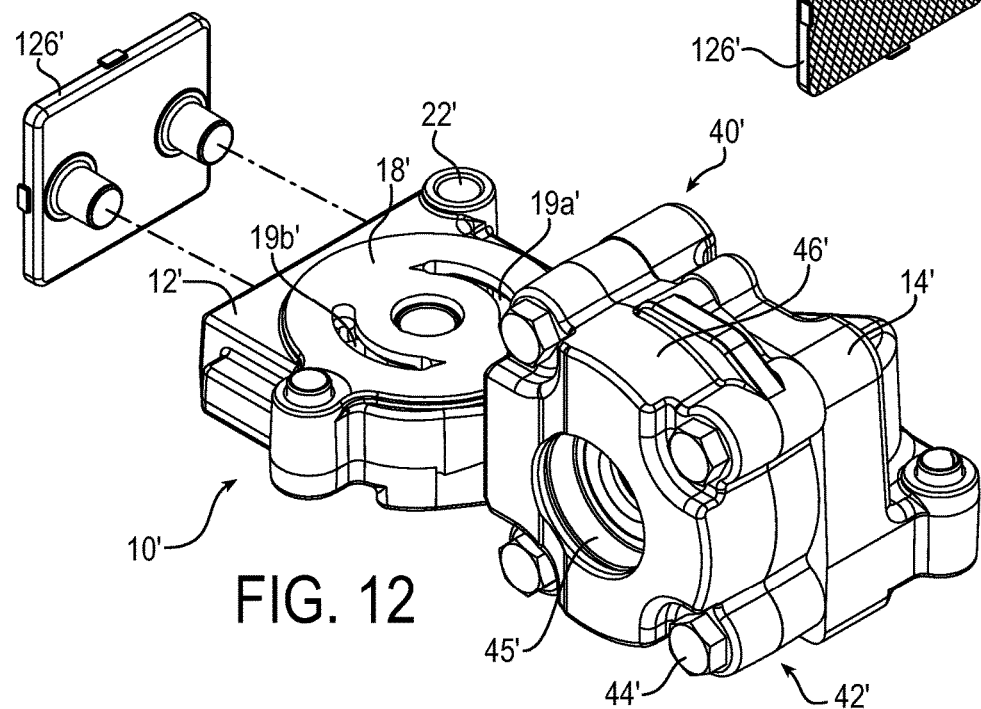
FIG. 12 is a drawing depicting a second perspective view of the exemplary left side center section/motor portion sub-assembly.

FIGS. 11 and 12 are drawings depicting two perspective views from different viewpoints of an exemplary left side assembled center section/motor portion sub-assembly 40' for use in a hydrostatic transmission. The left side sub-assembly 40' includes the described center section 10' and a motor portion 42'. The motor portion 42' has a motor housing 46' that encloses an internal rotor element similarly as to the right side, and the motor housing 46' is secured to the center section 10' adjacent to the motor running face 24' in a manner that permits rotation of the rotor element. In particular, the motor housing 46' may be secured adjacent to the motor running face using fastening elements 44' that are received in the motor fastening receivers 26' referenced above. As with the right side, the rotor element of the left side motor portion may have a gerotor configuration including an inner rotor and outer rotor that drive an output shaft. The motor housing 46' further includes a motor bearing bore 45' that supports the output shaft in combination with the center section bearing bore 31' referenced above. As referenced above, the left side motor portion 42' is comparable to the motor portion 42 on the right side, but mirror imaged and flipped over about the horizontal axis. Accordingly, there is part commonality as between the motor portions on the left and right sides.

FIG. 11 further depicts check valves 21*a'* and 21*b'*, as located in the valve cavities 20*a'* and 20*b'*. A filter 126' may be engaged with the center section by any suitable means. In an exemplary embodiment, the filter 126' may be a snap-in filter that is snapped into the valve cavities 20*a'* and 20*b'* adjacent to the check valves 21*a'* and 21*b'*.

In the dual hydrostatic transmission system currently being described, the center section/motor portion sub-assemblies 40 (right side) and 40' (left side) may be incorporated respectively into left and right side transmission assemblies, also commonly referred to as hydrostatic transmissions. Accordingly, the terms hydrostatic transmission and transmission assembly are used herein interchangeably. Subsequently, a modular hydrostatic transaxle system will be described, which includes a single hydrostatic transmission attached to a transaxle including a differential gearing system and an axle shaft. Again for convenience, reference first is made to a right side hydrostatic transmission for use in a dual hydrostatic transmission system, or for use as the single hydrostatic transmission in a modular hydrostatic transaxle system.

Figure 13:
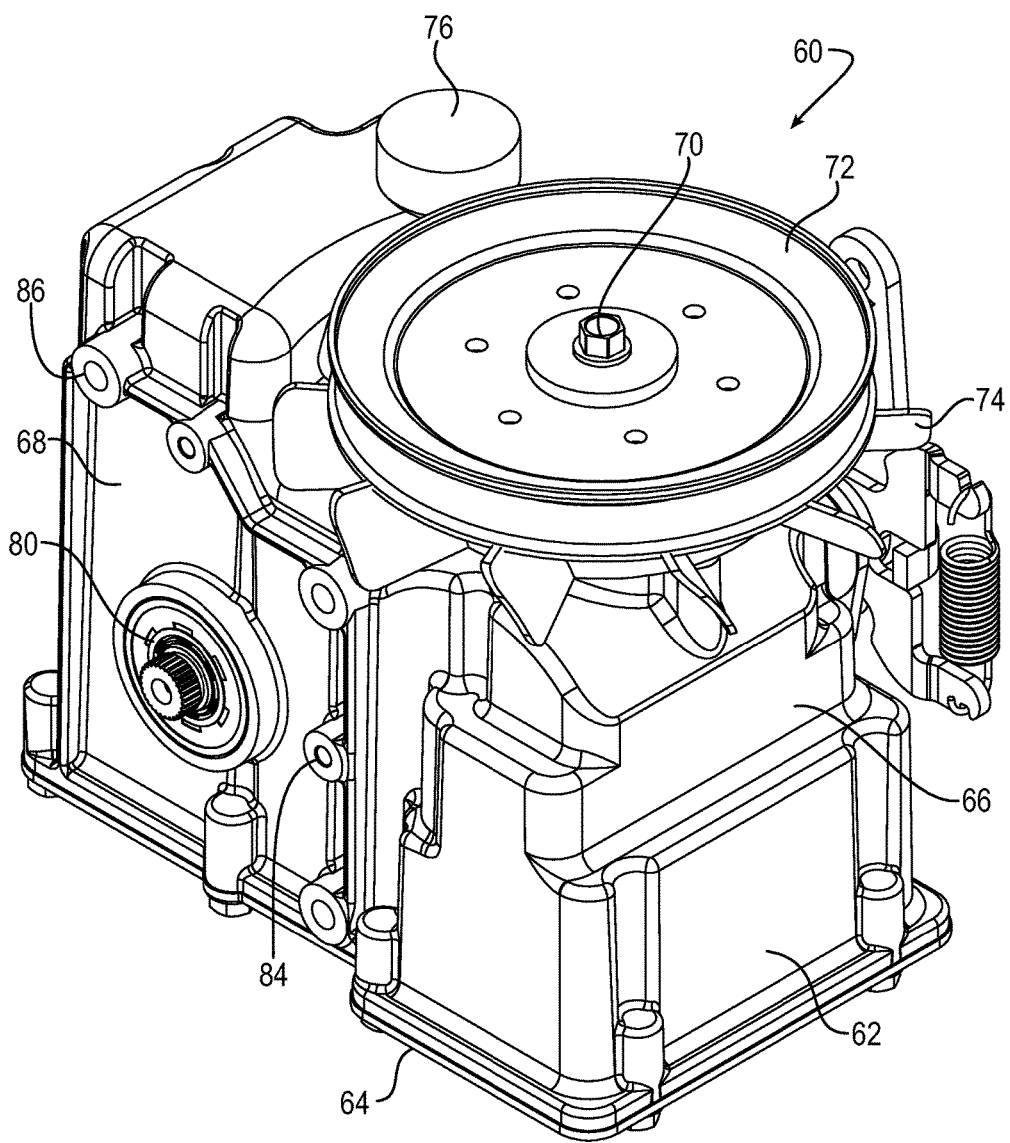
FIG. 13 is a drawing depicting a perspective view of an exemplary right side hydrostatic transmission in accordance with embodiments of the present invention.
Figure 14:
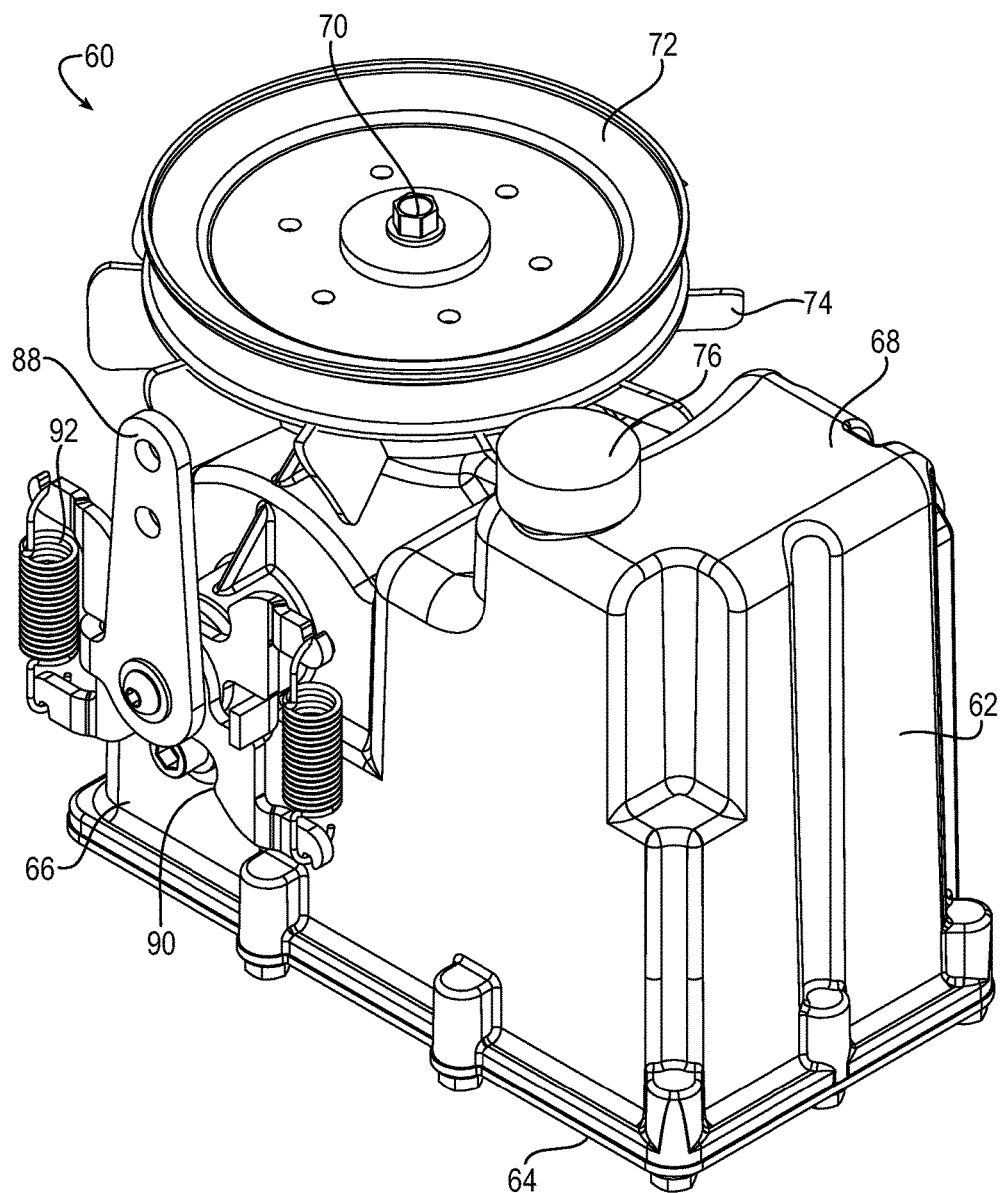
FIG. 14 is a drawing depicting a second perspective view of the exemplary right side hydrostatic transmission.

FIGS. 13 and 14 are drawings depicting two perspective views from different viewpoints of an exemplary right side hydrostatic transmission 60. The right side hydrostatic transmission 60 includes a top housing 62 fixed to a bottom plate 64. The top housing typically is die cast out of metal, and with the bottom plate 64 forms a housing for enclosing the center section/motor portion sub-assembly 40 described above. The hydrostatic transmission 60 further includes a pump housing portion 66 that encloses the pump components, and a motor housing portion 68 that encloses the motor, although it will be appreciated that the die cast nature of housing 62 results in a continuous component including both housing portions. On the pump housing portion 66, a fastener 70 is coupled internally to an input shaft of the pump, and the fastener extends outward from the housing. The fastener and attached input shaft may be coupled to an input belt pulley 72, and a fan 74 that operates to provide cooling for the hydrostatic transmission. Enhanced cooling is provided by mounting the fan to the input shaft directly adjacent to the input belt pulley. A breather cap 76 is located on the top of the motor housing portion 68.

FIG. 13 in particular depicts the hydrostatic transmission from the viewpoint of the output shaft side. As seen in such figure, the hydrostatic transmission includes an output shaft assembly 80. On the output shaft side, the housing further may include a plurality of dowel pin holes 84 and/or a plurality of fastener holes 86. The holes 84/86 are for aligning and fastening a gearbox unit that is driven by the output shaft ultimately to drive the right side wheel.

FIG. 14 in particular depicts the hydrostatic transmission from the viewpoint of the control arm side. As seen in such figure, the hydrostatic transmission includes a control arm 88 coupled to a return-to-neutral (RTN) mechanism 90. The control arm 88 provides an external link or interface to the vehicle operator controls as is known in the art, such as linking the handles and/or lever controls that the operator may employ to drive the vehicle. The RTN mechanism 90 includes dual spring loaded bracket assemblies 92. A more detailed description of the RTN mechanism may be found in the commonly-owned patent application Ser. No. 13/712,365 (U.S. Patent Publication No. 2013/0145890), the content of which is incorporated here by reference.

Figure 15A:
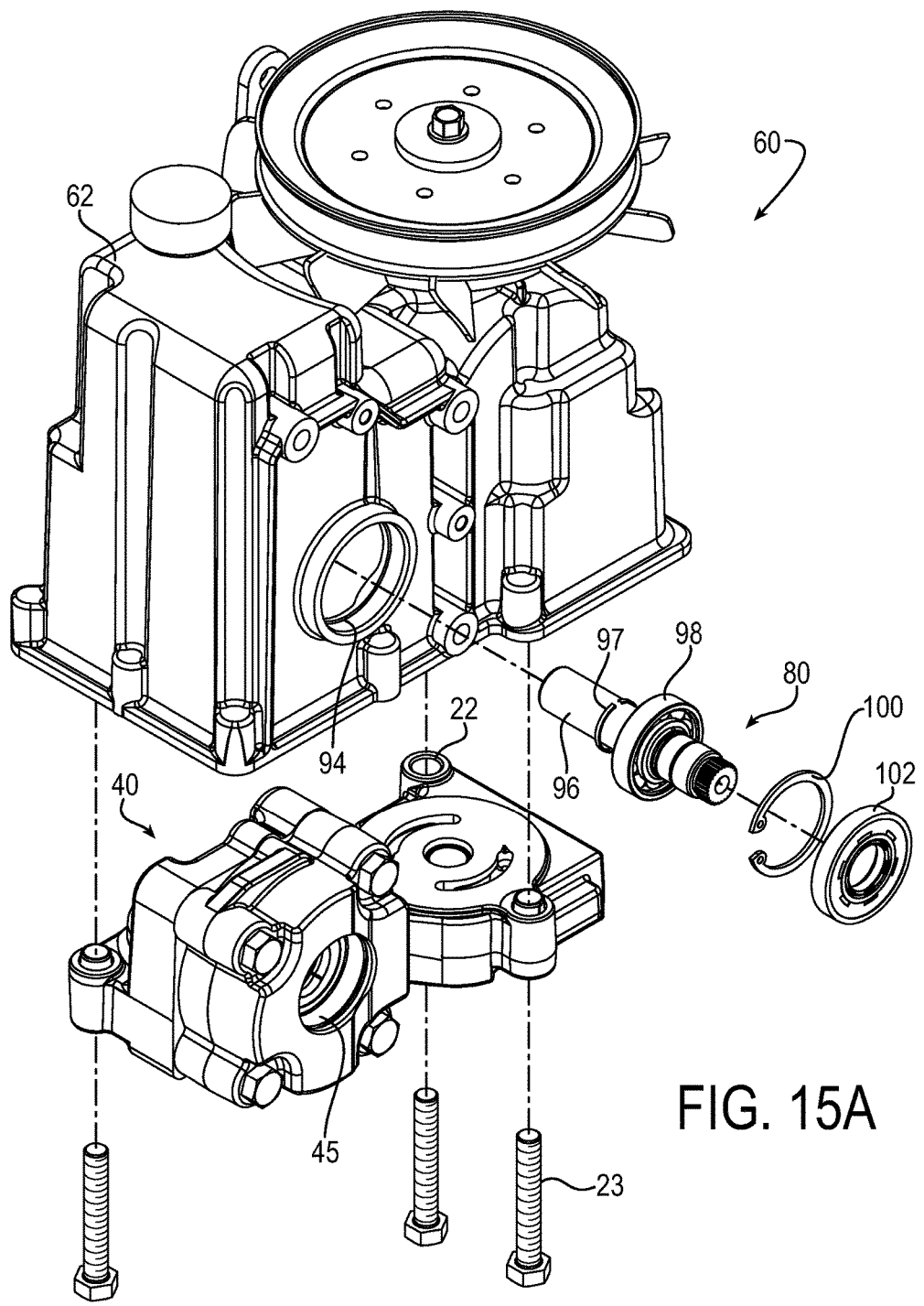
FIGS. 15A-B are drawings depicting perspective views of the exemplary right side hydrostatic transmission, with an exploded view of the components of an output shaft assembly and center section/motor portion sub-assembly.
Figure 15B:
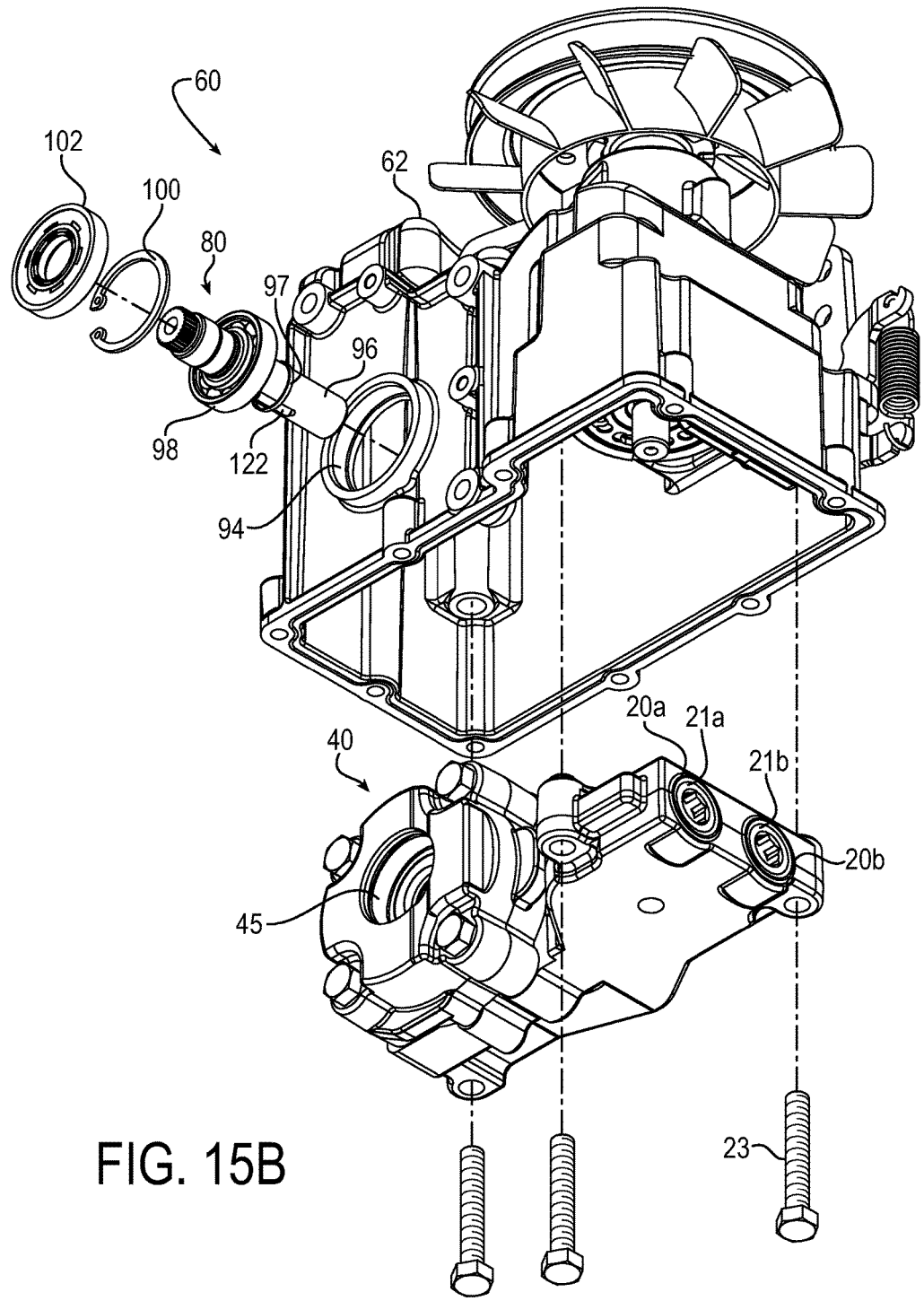

FIGS. 15A and 15B are drawings depicting perspective views of the exemplary right side hydrostatic transmission 60, with an exploded view of the components of an output shaft assembly 80 and center section/motor portion sub-assembly 40. FIGS. 15A-B in particular depict how these various sub-assemblies are joined together. The output shaft assembly 80 extends outward from the top housing 62 through a bore 94. The output shaft assembly 80 includes an output shaft 96 having a bearing 98 that that is supported by motor housing between the center section bearing bore 31 and the motor housing bearing bore 45 referenced above (only the bore 45 is visible in FIGS. 15A-B) when assembled and installed into the hydrostatic transmission. Adjacent to the output shaft assembly 80 is a retaining ring 100, and a shaft seal 102 which provides a seal between the housing bore and the output shaft. A comparable configuration of an output shaft assembly is provided for the left side hydrostatic transmission.

An advantage of this configuration of output shaft assembly is that overall size of the hydrostatic transmission is reduced. Lateral width of the hydrostatic transmission is reduced in particular. This is significant for zero-turn radius vehicles, in which space is at a premium. The described configuration permits initial installation of center section/motor portion assembly (described above) within the housing. After this initial installation, the output shaft assembly can be installed in the housing bore as a separate assembly step. After installation of the center section/motor portion assembly into the housing, the output shaft assembly may be installed through bore 94 into the center section/motor portion, such that the in board end of the shaft is supported by the bearing being seated at the center section. The output shaft bearing 98 resides adjacent bearing bores 31 and 45. In conventional configurations, the output shaft is pre-installed to the center section, requiring a widening of the housing for installation. By providing the described output shaft assembly, which may be separately installed, the requisite lateral width of the top housing is reduced, thereby advantageously reducing the overall width of the hydrostatic transmission.

The output shaft 96 includes a male spline that can mate with a female input pinion gear on a drive gearbox that drives the rotation of the wheel. As referenced above, the gearbox is aligned and secured to the housing via the dowel and fastener holes 82 and 84.

FIGS. 15A-B depict the manner of installation of the center section/motor portion sub-assembly 40 within the top housing 62. Fastening elements 23 are extended through the fastening receivers 22 of the center section, which in turn are received within cooperating elements of the top housing. The bottom plate 64 is then secured to the top housing to enclose the center section/motor portion sub-assembly 40 within the top housing 62.

Referring to FIG. 15B in particular, a key 122 is held against the output shaft 96 by a low profile retaining ring 97. During installation, the low profile retaining ring 97 holds the key 122 in place so that the key is positioned and aligned properly between the motor portion 42 and output shaft 96. Once installed, during operation the key operates to transmit torque from the motor to the output shaft.

Figure 16:
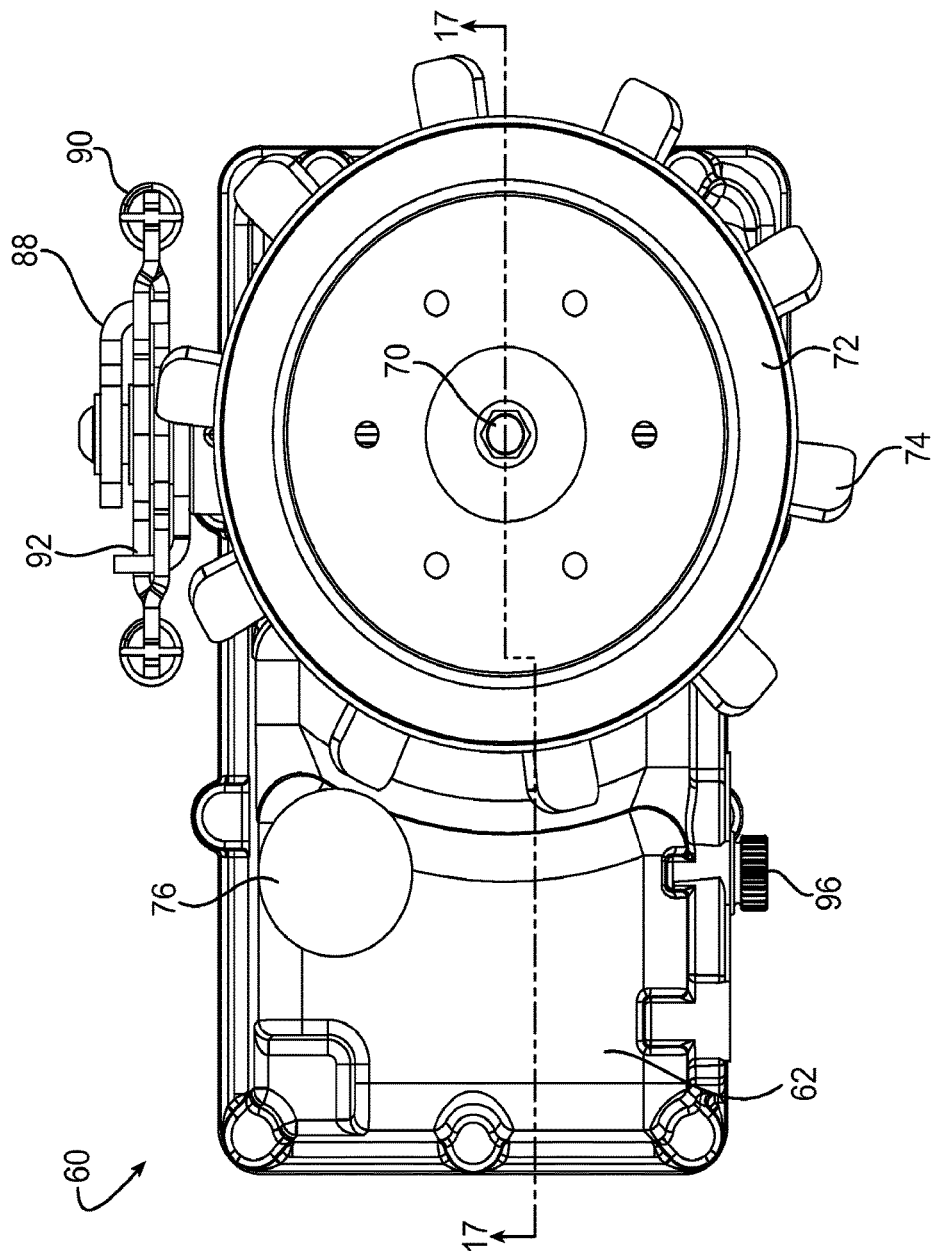
FIG. 16 is a drawing depicting a top view of the exemplary right side hydrostatic transmission.

FIG. 16 is a drawing depicting a top view of the exemplary right side hydrostatic transmission. FIG. 16 is utilized as a reference figure for generating a cross-sectional view of the hydrostatic transmission 60. In particular, FIG. 17 is a drawing depicting a cross-sectional view of the hydrostatic transmission along the line 17-17 of FIG. 16.

Figure 17:
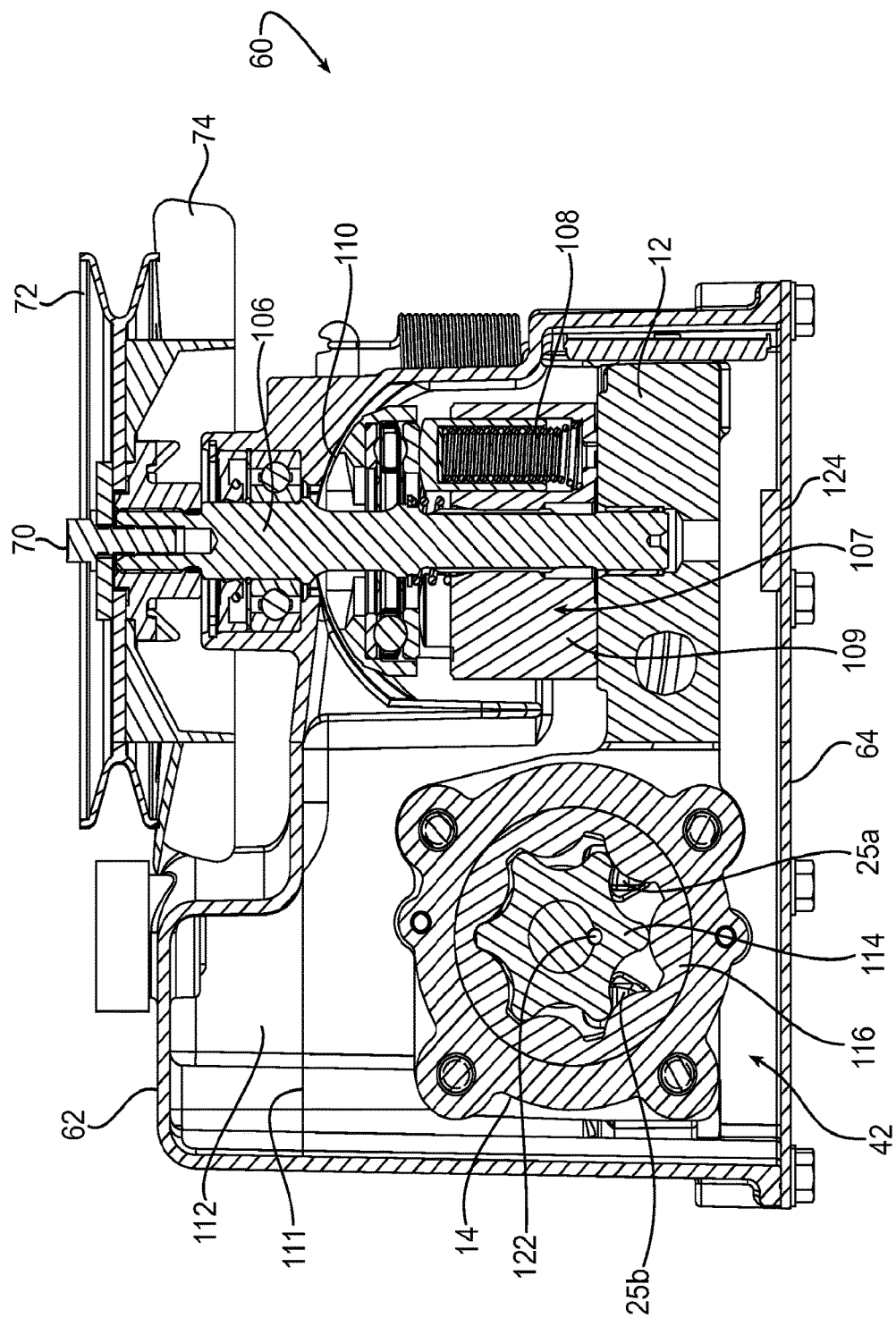
FIG. 17 is a drawing depicting a cross-sectional view of the right side hydrostatic transmission along the line 17-17 of FIG. 16.

As seen in FIG. 17, the pump portion includes an input shaft 106 that is connected at one end to the fastener 70. The fastener 70 secures the pulley, fan, and pulley hub to the input shaft 106. A piston rotating group 107 includes a plurality of pistons 108 that are supported on a barrel 109. The rotating group is driven by the input shaft 106 and rotates against the pump running face of the center section and adjacent a swash plate 110. In operation, the operator effects control to move the control arm 88, which in turn causes a rotation of the swash plate 110. For example, the swash plate may rotate within a range of ±14°. With the rotation of the swash plate, the pistons extend and contract to drive the hydraulic fluid in and out. The flow is directed through the motor portion to produce a power output via the output shaft 96.

The top housing 62 of the hydrostatic transmission encloses a fluid reservoir of hydraulic fluid 111. The top housing 62 may define a sufficient volume in excess of the fluid volume 111 constituting an integral fluid expansion volume 112. The integral fluid expansion volume provides adequate space for the hydraulic fluid to expand during temperature changes, particularly during operation. By providing a reservoir with adequate expansion volume integral in the top housing, the hydraulic fluid of the right side and left side hydrostatic transmissions are always separate.

This configuration has space-saving advantages over conventional configurations that have a common or shared fluid reservoir and expansion volume that accommodates both the left and right sides. This configuration relatedly eliminates the need for any external expansion reservoir, whether shared or separate for the left and right sides, as is required in some conventional configurations.

FIG. 17 further depicts the gerotor configuration of the motor portion 42 (identified above more generally as the rotor set). In this exemplary embodiment, the motor portion 42 includes a rotor set having a gerotor configuration with an inner rotor 114 with six rotor lobes, and an outer rotor 116 with seven rotor lobes. Kidney ports 25a and 25b between rotor lobes permit entry of hydraulic fluid into the motor portion, depending upon the operation of the control arm. In particular, fluid enters through one of the ports and exits through the other port such that the fluid travels in a complete hydraulic circuit through the pump and the motor. The motor will spin either clockwise or counterclockwise depending on the direction of flow as dictated by the direction of rotation of the control arm. The eccentricity of the outer rotor 116 relative to the inner rotor 114 is such that the rotation axis of the outer rotor is positioned lower than the rotation axis of the inner rotor, and thus the output shaft.

As a result, the displacement volume created by the rotation of the outer and inner rotors is increasing on one side or the other depending on the direction of flow. The direction of flow, such as whether the fluid enters kidney port 25a and exits through kidney port 25b or vice versa, is determined by the operation of the control arm. For example, the control arm may be operated to port fluid into kidney port 25a and out of kidney port 25b, which causes the rotors to spin clockwise as fluid flows between the lobes. Alternatively, the control arm may be operated to port fluid through into kidney port 25b and out of kidney port 25a, which causes the rotors to spin counterclockwise.

FIG. 17 also depicts the positioning of the key 122 as installed. As referenced above, the key 122 transmits torque from the motor to the output shaft 96. Referring back again to FIG. 15B, the low profile retaining ring 97 retains the key 122 against the output shaft 96 initially during installation, and a retaining clip holds the output shaft in place. In this manner, during installation the key 122 is properly aligned by the ring 97 for installation into the motor. The components are configured to permit the ring 97 to be pushed and slide off the key 122 during installation into an innocuous location, becoming snuggly fit around the output shaft.

Also on the pump side, FIG. 17 depicts a magnet 124 that is adhered to the bottom plate 64. The magnet is provided below the check valves adjacent the valve cavities of the center section. The magnet captures ferrous metallic particles that are contaminants in the reservoir of hydraulic fluid, prior to the particles being drawing into the fluid passages of the center section. Because the bottom plate 64 typically itself is made of a ferrous metallic material, the magnet 124 may be attached to the bottom plate by magnetic forces alone. The magnet may be employed by itself, or used in conjunction with a filter or strainer that can remove non-ferrous contaminants.

Figure 18:
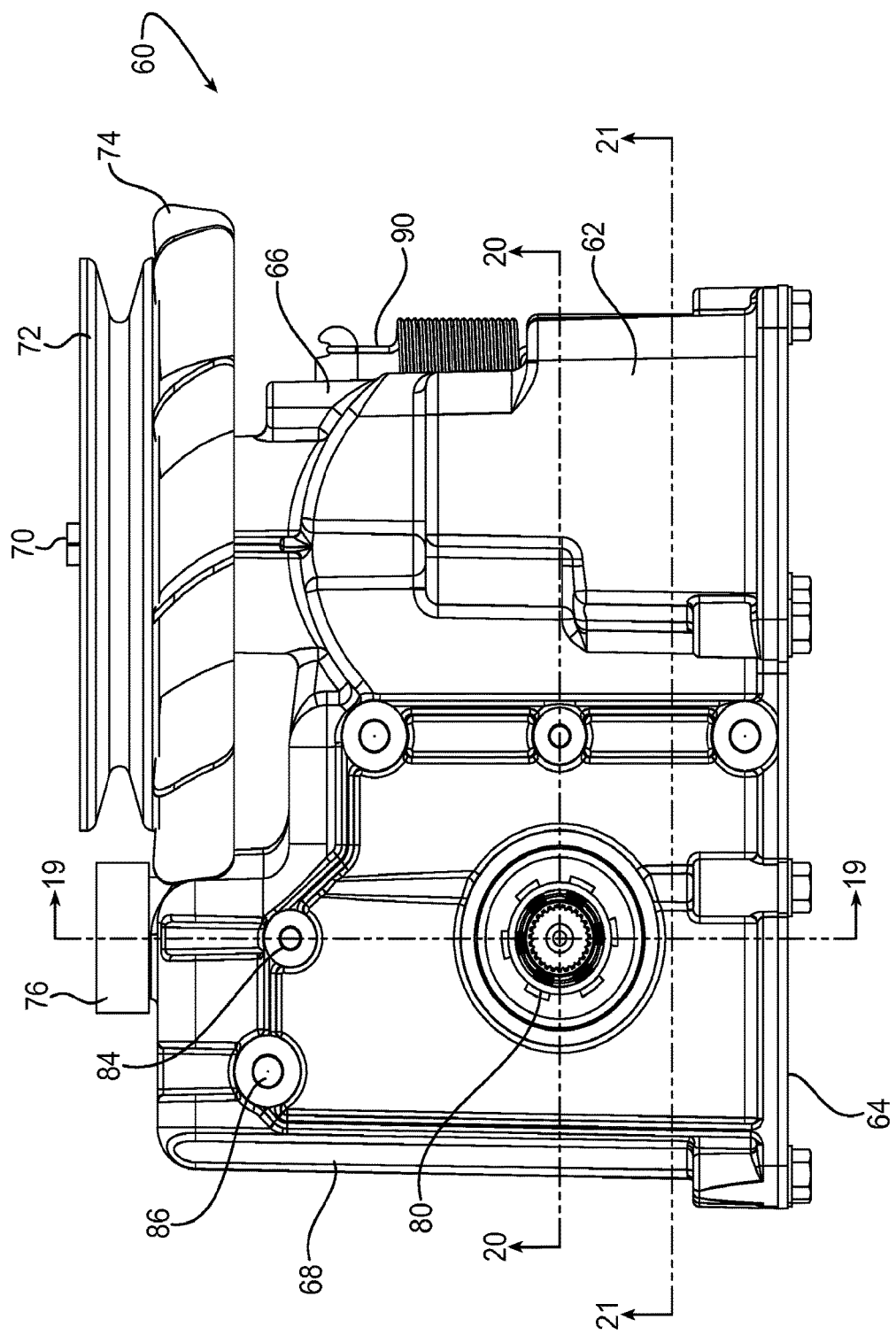
FIG. 18 is a drawing depicting a side view on the output shaft side of the exemplary right side hydrostatic transmission.
Figure 19:
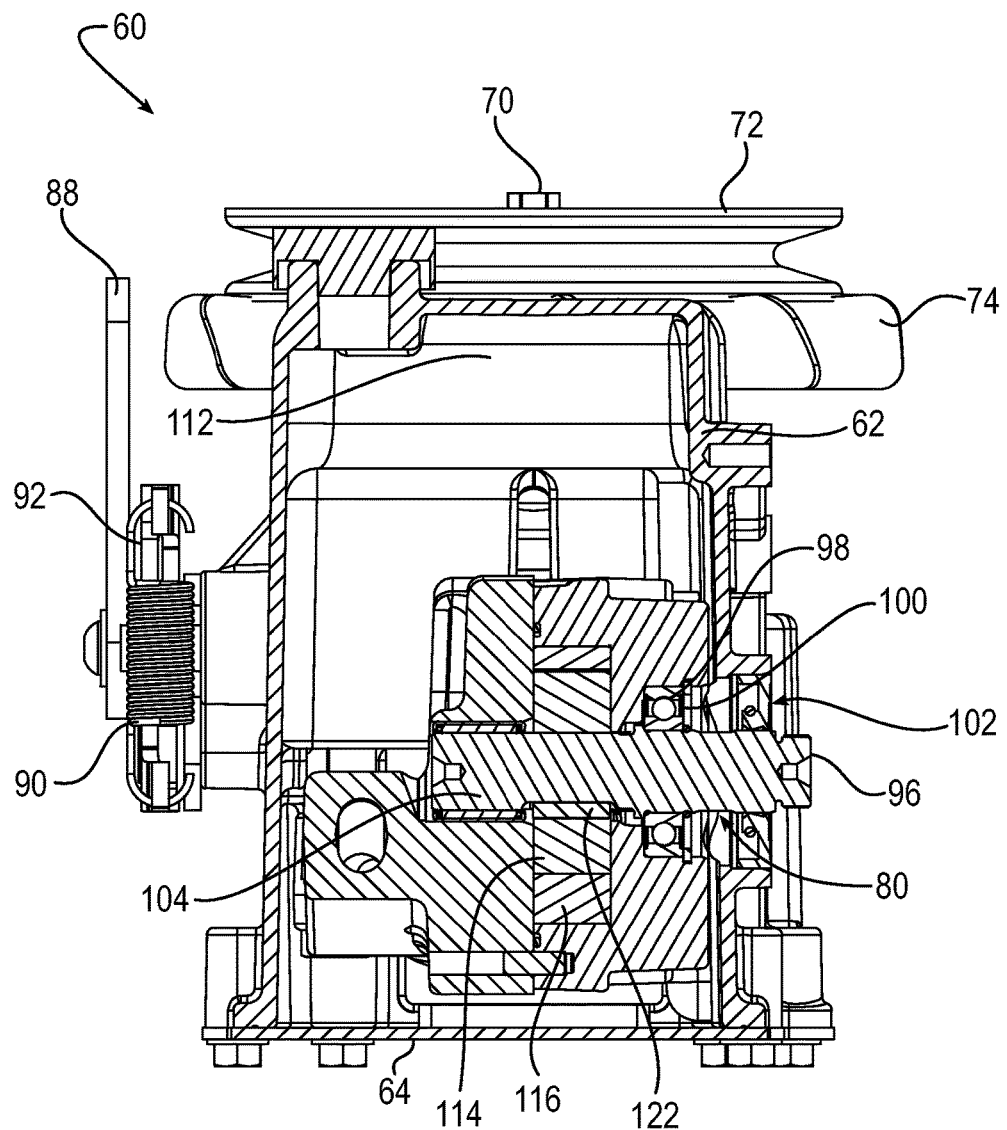
FIG. 19 is a drawing depicting a cross-sectional view of the right side hydrostatic transmission along the line 19-19 of FIG. 18.
Figure 20:
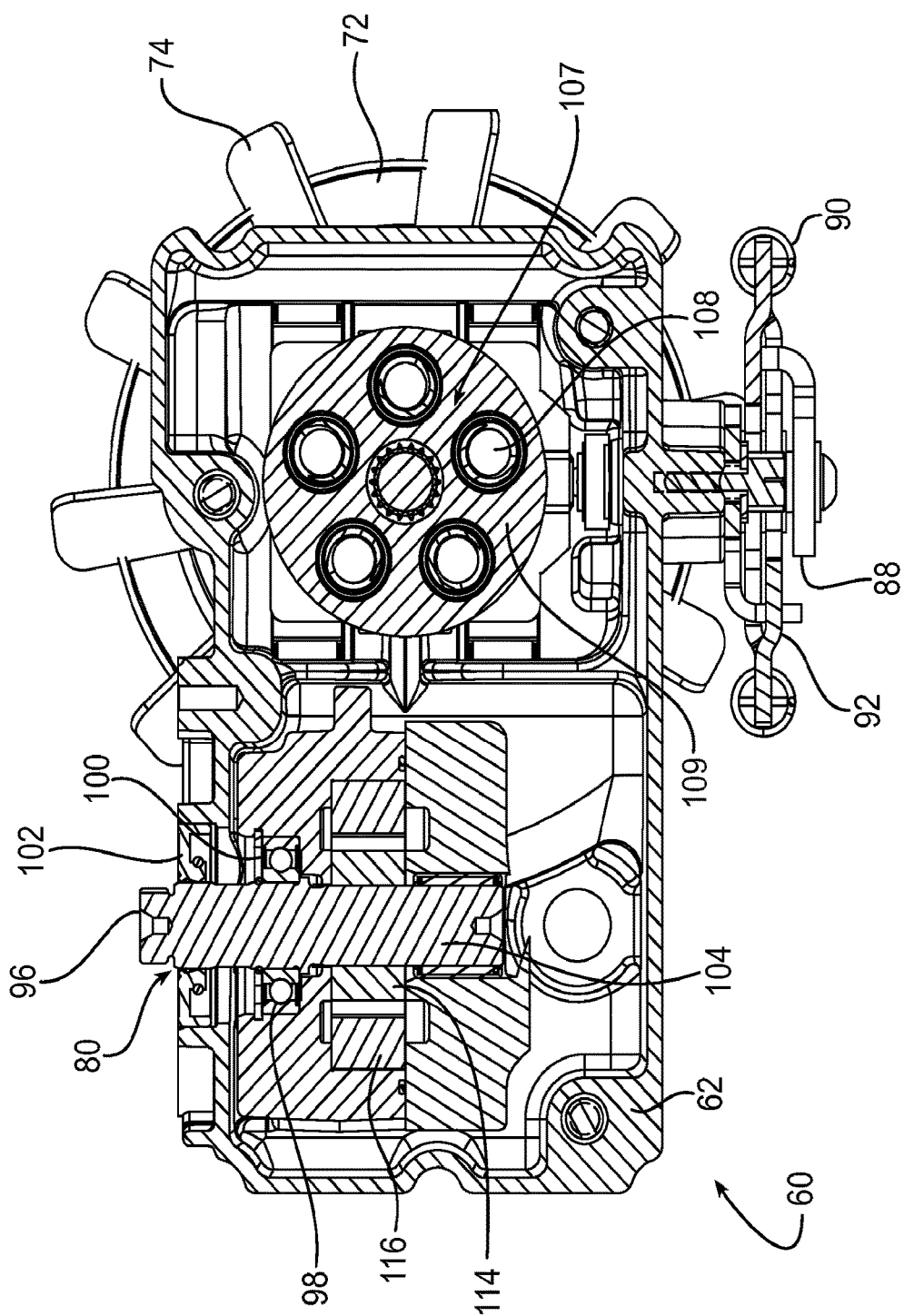
FIG. 20 is a drawing depicting a cross-sectional view of the right hydrostatic transmission along the line 20-20 of FIG. 18.
Figure 21:
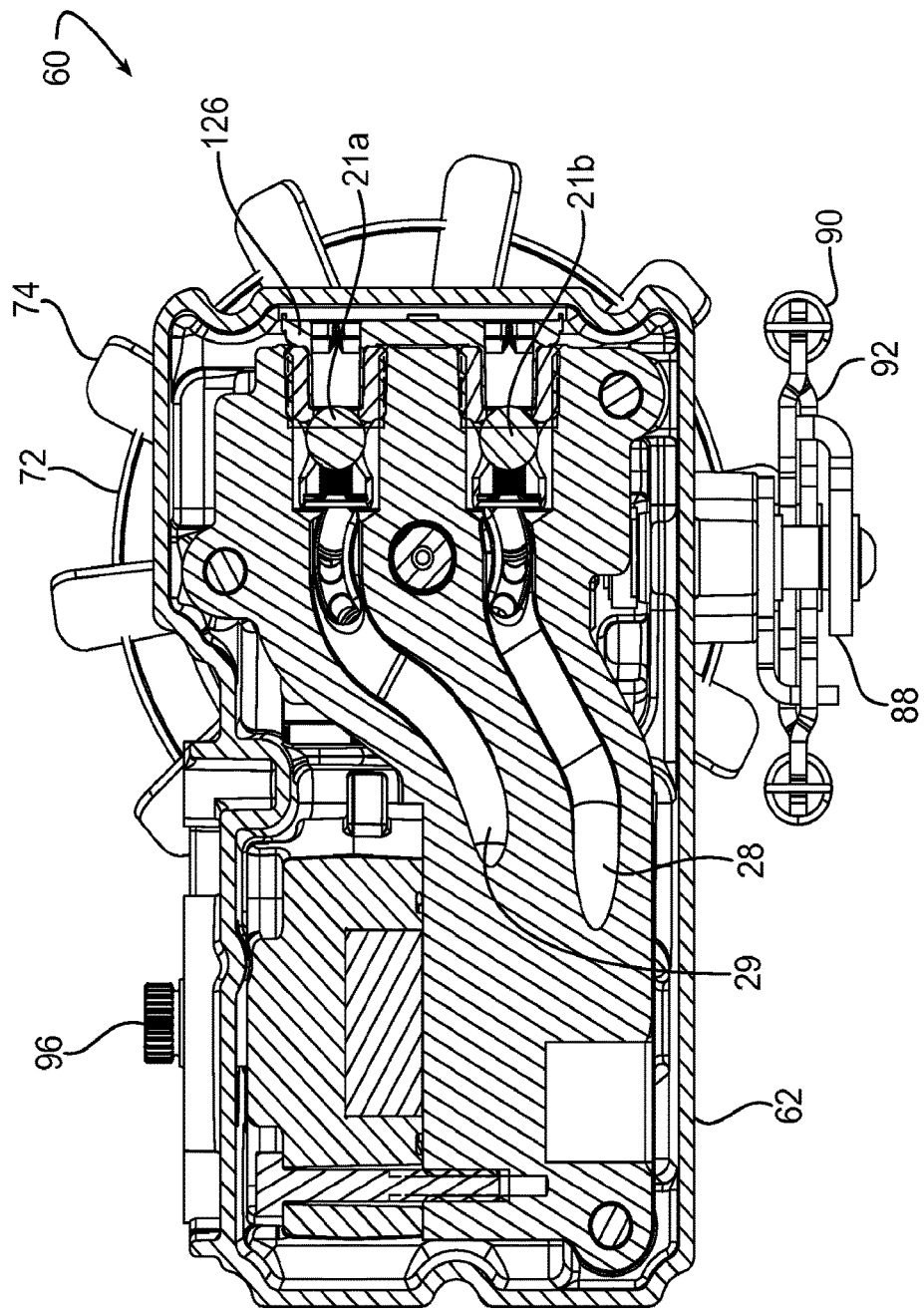
FIG. 21 is a drawing depicting a bottom cross-sectional view of the exemplary right side hydrostatic transmission along the line 21-21 of FIG. 18.

FIG. 18 is a drawing depicting a side view on the output shaft side of the exemplary right side hydrostatic transmission. FIG. 18 is utilized as a reference figure for generating additional cross-sectional views of the hydrostatic transmission 60. In particular, FIG. 19 is a drawing depicting a cross-sectional view of the hydrostatic transmission along the line 19-19 of FIG. 18. FIG. 20 is a drawing depicting a cross-sectional view of the hydrostatic transmission along the line 20-20 of FIG. 18. FIG. 21 is a drawing depicting a bottom cross-sectional view of the hydrostatic transmission along the line 21-21 of FIG. 18.

FIGS. 19 and 20 show the various components described above from additional viewpoints. Of note, FIGS. 19 and 20 provide additional cross-sectional views of the output shaft assembly components as installed within the hydrostatic transmission 60. The output shaft 96 is positioned at a first end 104 through the gerotor components of the motor portion and into the center section. The bearing 98 is supported by the motor housing. The retaining ring 100 and shaft seal 102 are located within or adjacent the bore cut through the top housing. A need for separate retaining ring to retain the seal, as typical in conventional configurations, is eliminated due to the mating part of a gearbox having a surface that retains the seal.

The configuration of the present invention provides for a more economical construction because, to accommodate a conventional retaining ring, a ring groove must be machined into the housing with significant precision, and additional outboard securing features typically are required. Such conventional configuration also requires an increased housing size. For this reason also, the configuration of the described output shaft assembly 80 reduces the requisite lateral width of the top housing. Again, a comparable configuration of an output shaft assembly is provided for the left side hydrostatic transmission. FIG. 19 also shows the key 122 as installed, which transmits torque from the motor to the output shaft 96 as referenced above. FIG. 20 provides an additional view of the manner of configuration of the piston rotating group 107, including the pistons 108 supported by the barrel 109.

FIG. 21 is a drawing depicting a bottom cross-sectional view of the exemplary right side hydrostatic transmission. FIG. 21 shows a view of the configuration of the fluid passages through the center section, comparably as in FIG. 4. FIG. 21 also shows the check valves 21a and 21b for the control of the fluid flow into the center section. The filter 126 further may be provided as referenced above, such as for example by a snap-in mechanism, engaging the check valves.

In a dual hydrostatic transmission system, there are at least a first or right side hydrostatic transmission that drives the right side wheel, and a second or left side hydrostatic transmission that drives the left side wheel. The right side and left side hydrostatic transmissions have comparable components, although the precise configuration of the components relative to each other may be flipped and/or rotated because of the differing relative position of the right side wheel relative to the right side transmission, versus the position of the left side wheel relative to the left side hydrostatic transmission.

FIGS. 22-29, therefore, are drawings depicting a left side hydrostatic transmission and its associated components.

Because the various components are comparable on both the right and left sides, as above in the left side "prime" designations are added to comparable reference numerals for the corresponding right side components. Accordingly, the various figures are identified below, but again for convenience duplicative descriptions of comparable components are not provided to the extent the above right side description applies.

Figure 22:
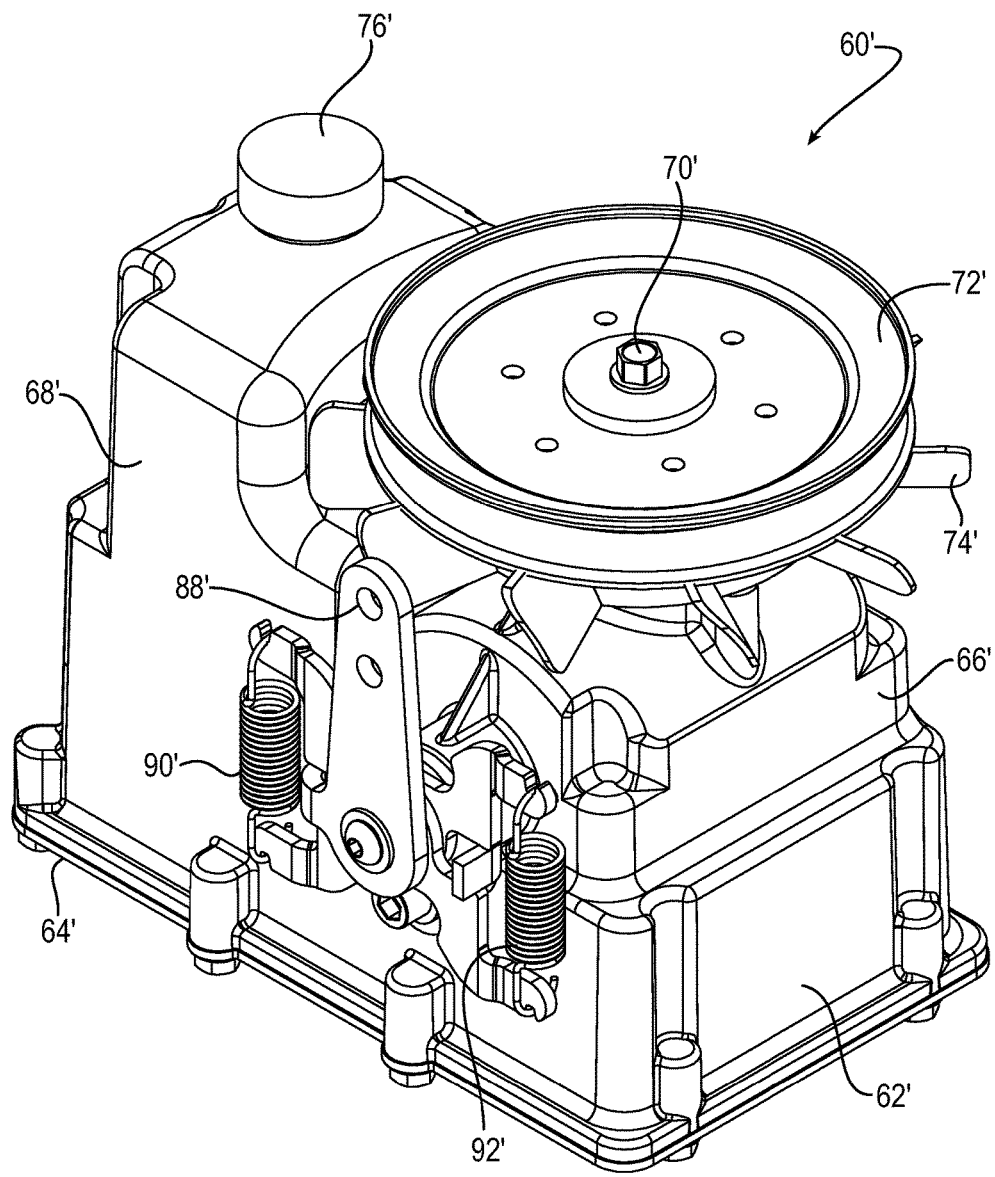
FIG. 22 is a drawing depicting a perspective view of an exemplary left side hydrostatic transmission in accordance with embodiments of the present invention.
Figure 23:
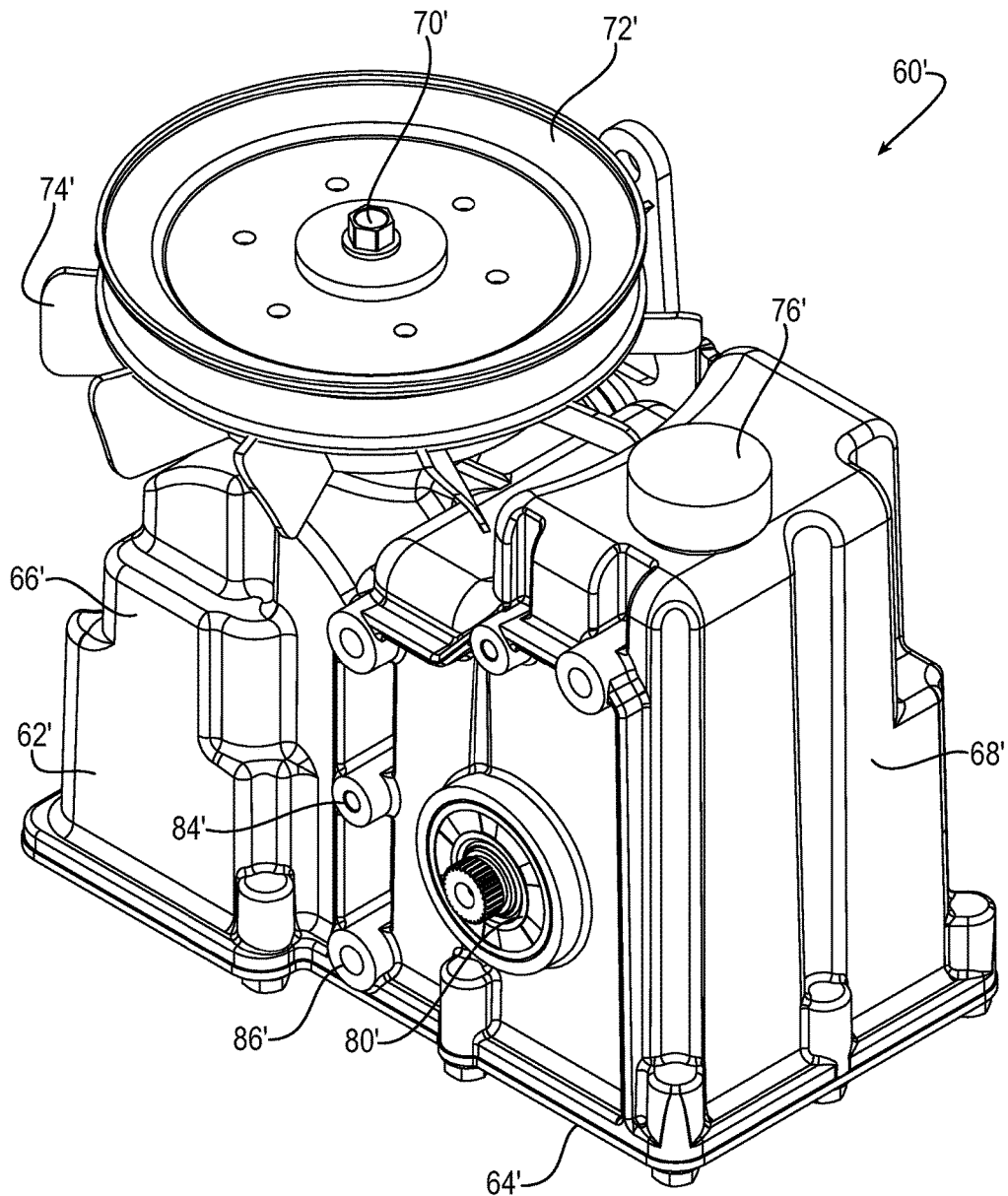
FIG. 23 is a drawing depicting a second perspective view of the exemplary left side hydrostatic transmission.
Figure 24:
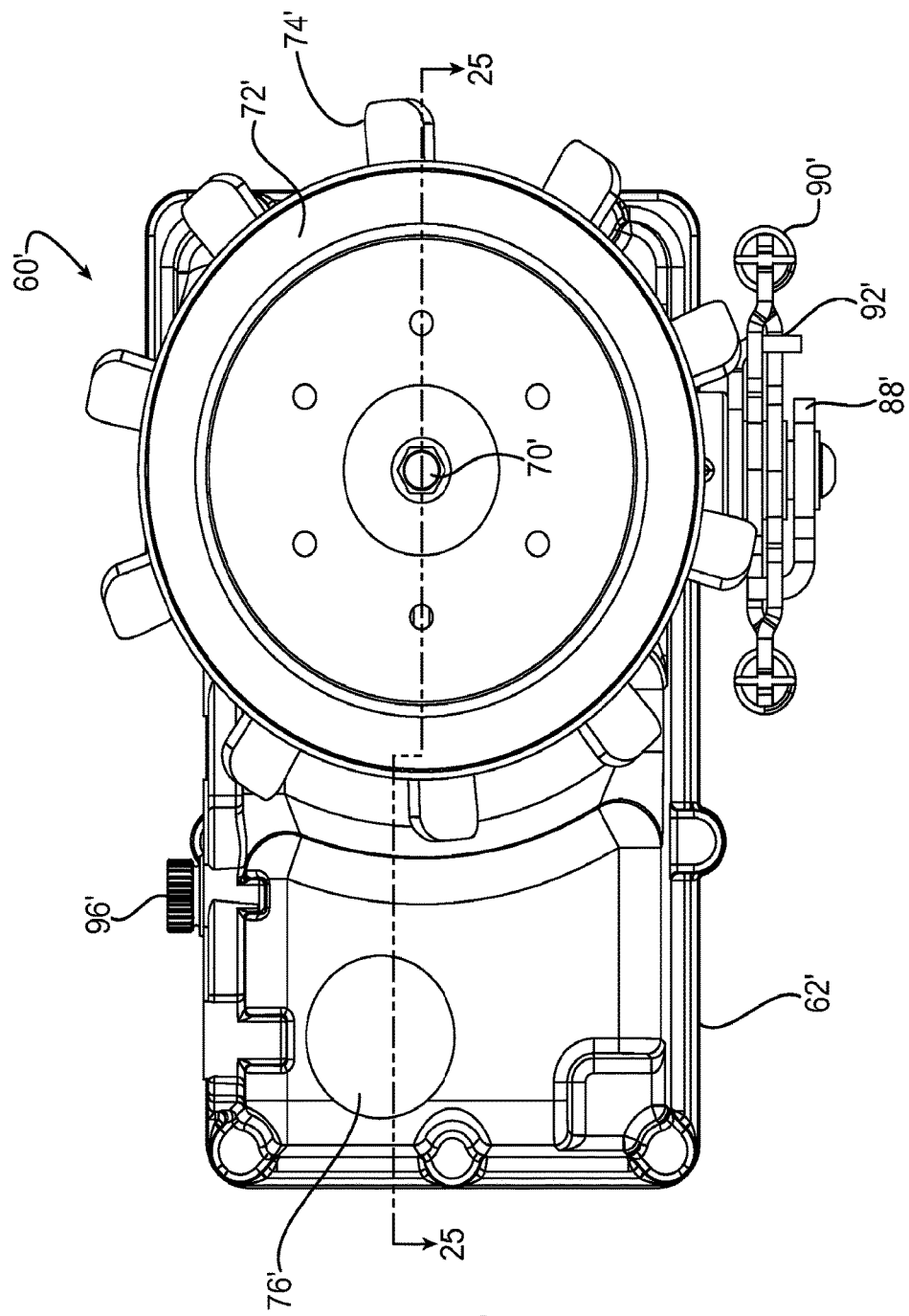
FIGS. 24 is a drawing depicting a top view of the exemplary left side hydrostatic transmission.
Figure 25:
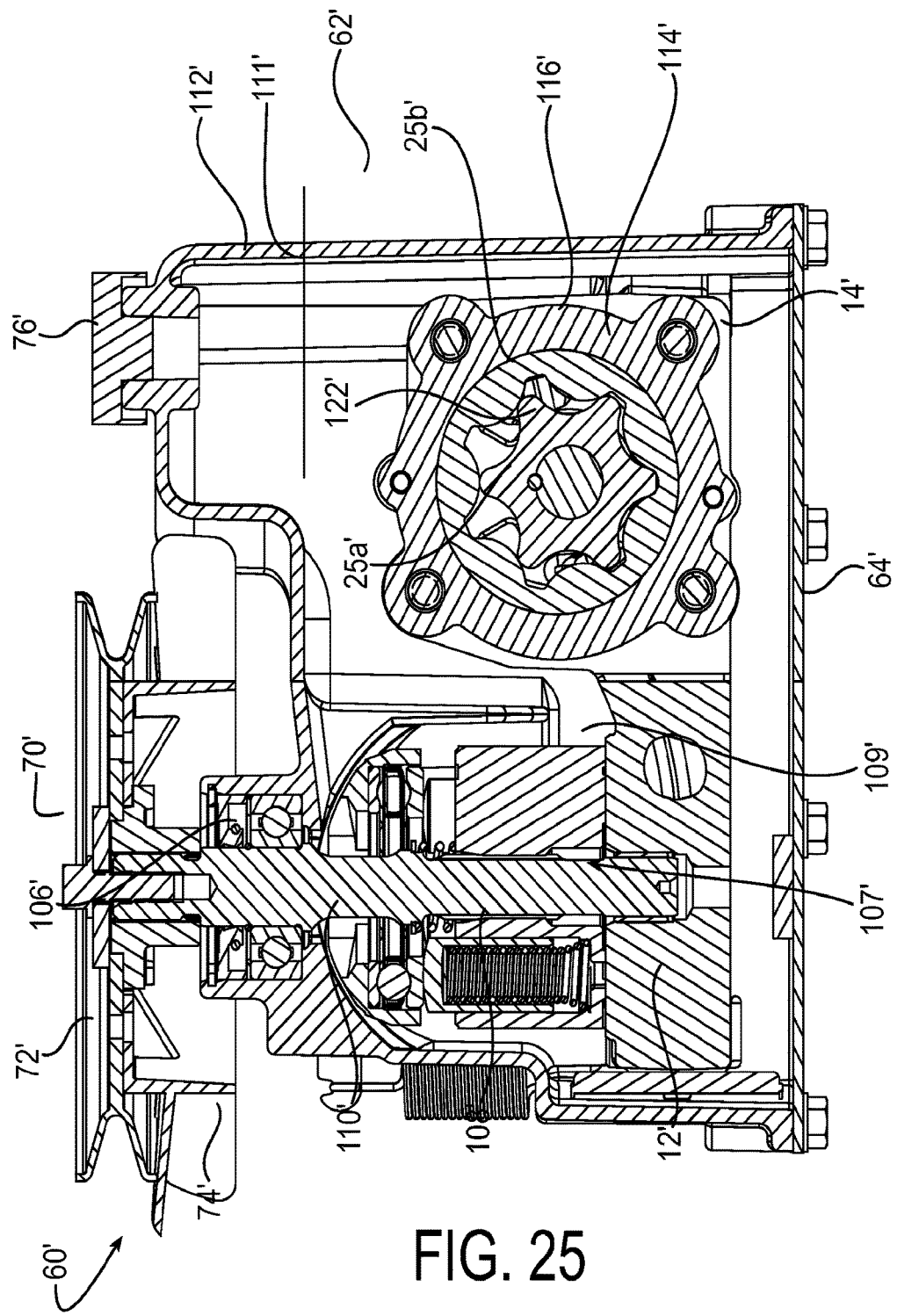
FIG. 25 is a drawing depicting a cross-sectional view of the left side hydrostatic transmission along the line 25-25 of FIG. 24.
Figure 26:
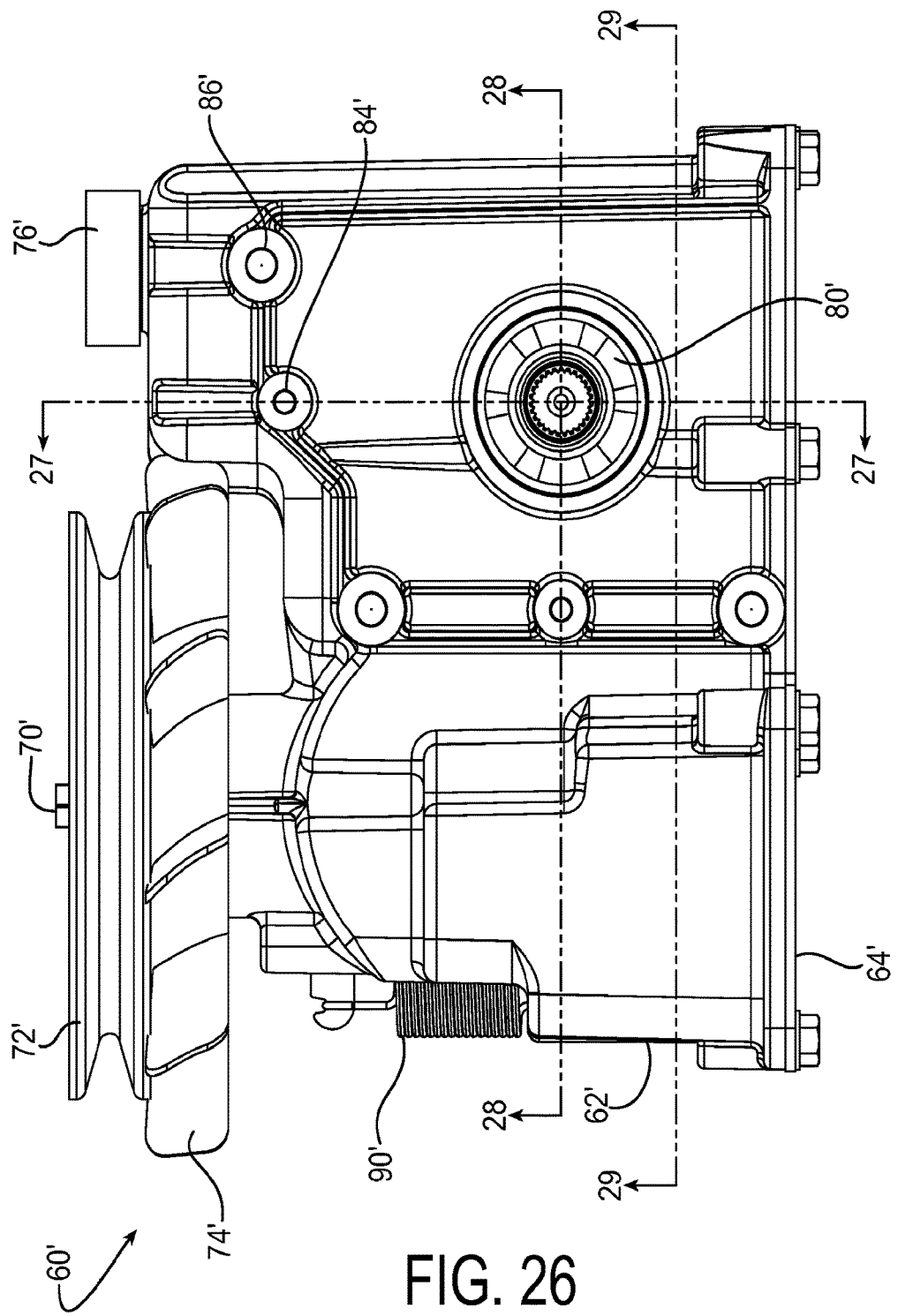
FIG. 26 is a drawing depicting a side view on an output shaft side of the exemplary left side hydrostatic transmission.
Figure 27:
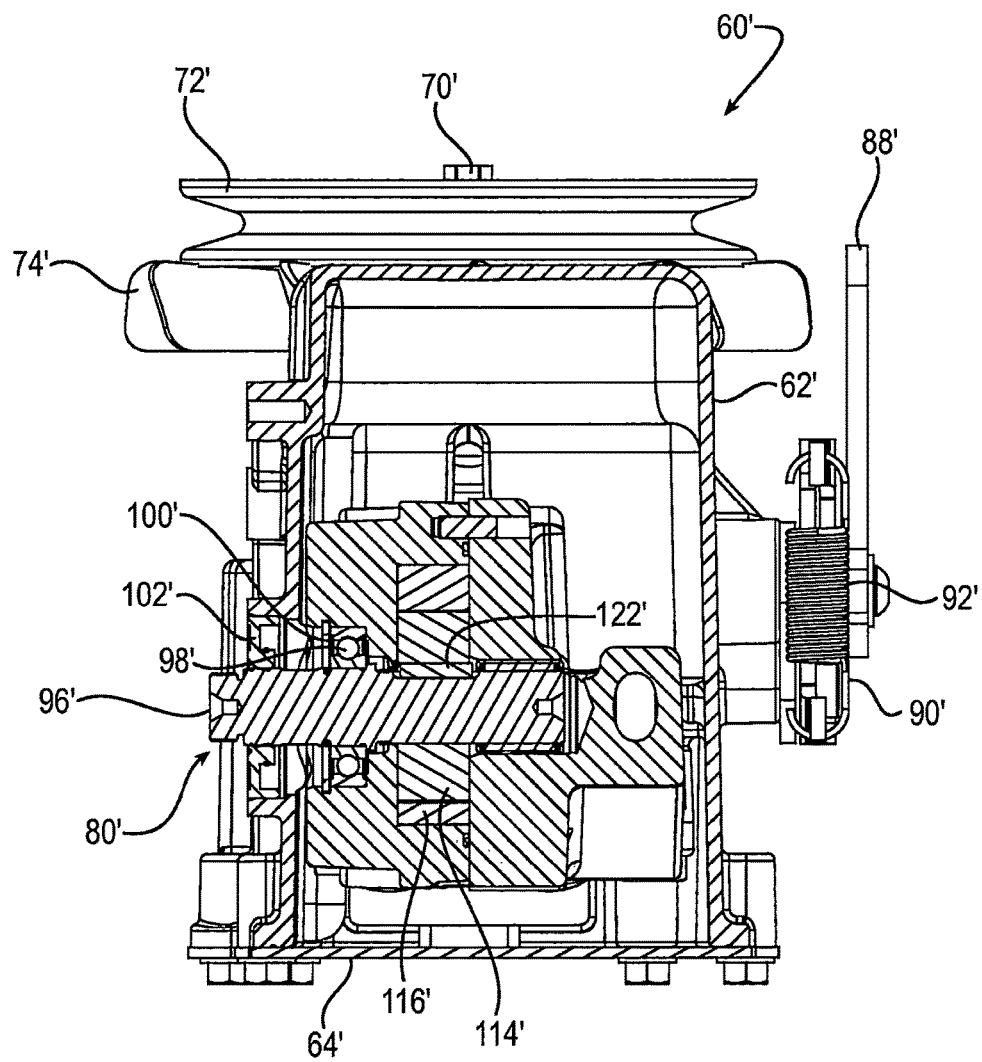
FIG. 27 is a drawing depicting a cross-sectional view of the left side hydrostatic transmission along the line 27-27 of FIG. 26.
Figure 28:
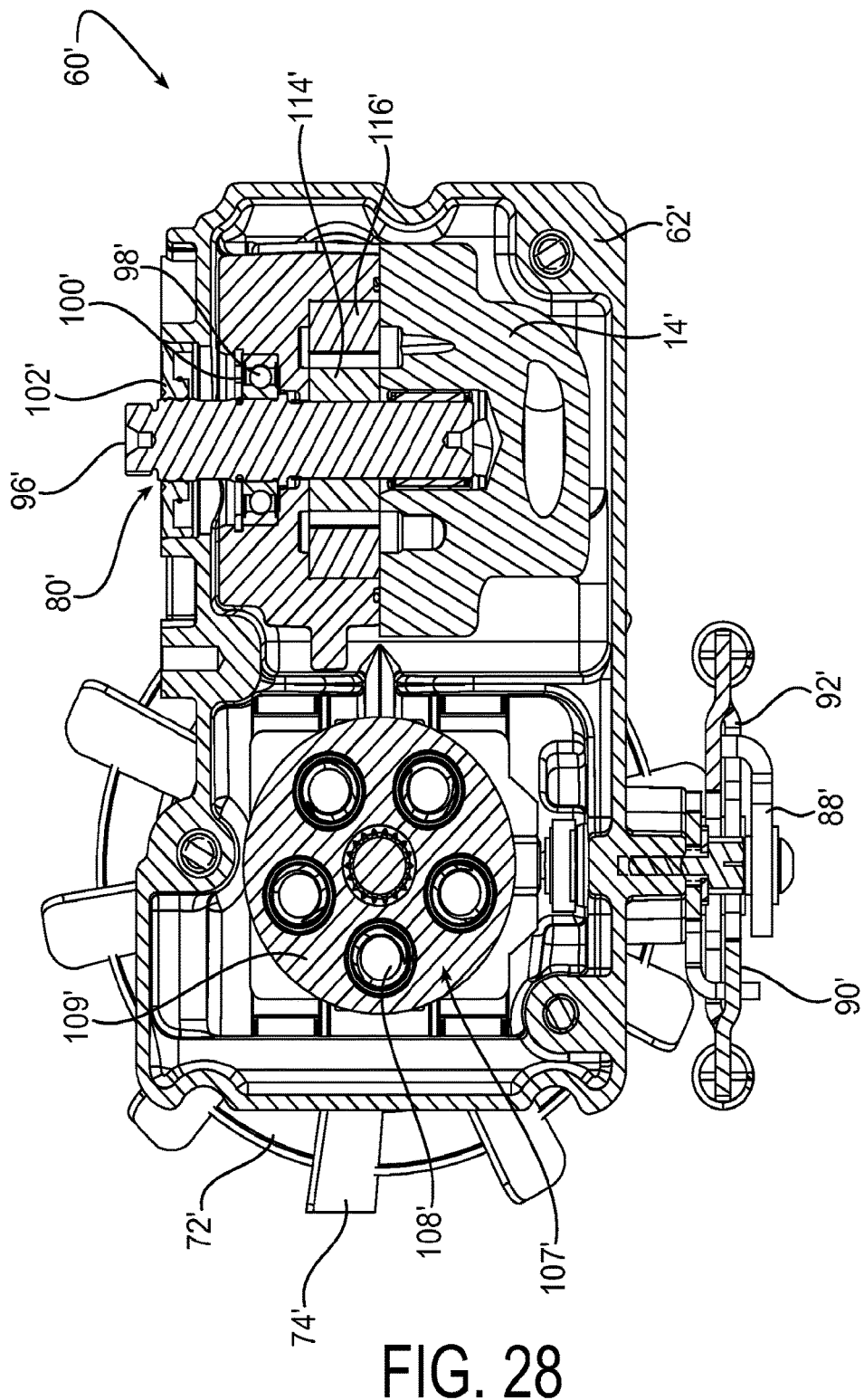
FIG. 28 is a drawing depicting a cross-sectional view of the left side hydrostatic transmission along the line 28-28 of FIG. 26.
Figure 29:
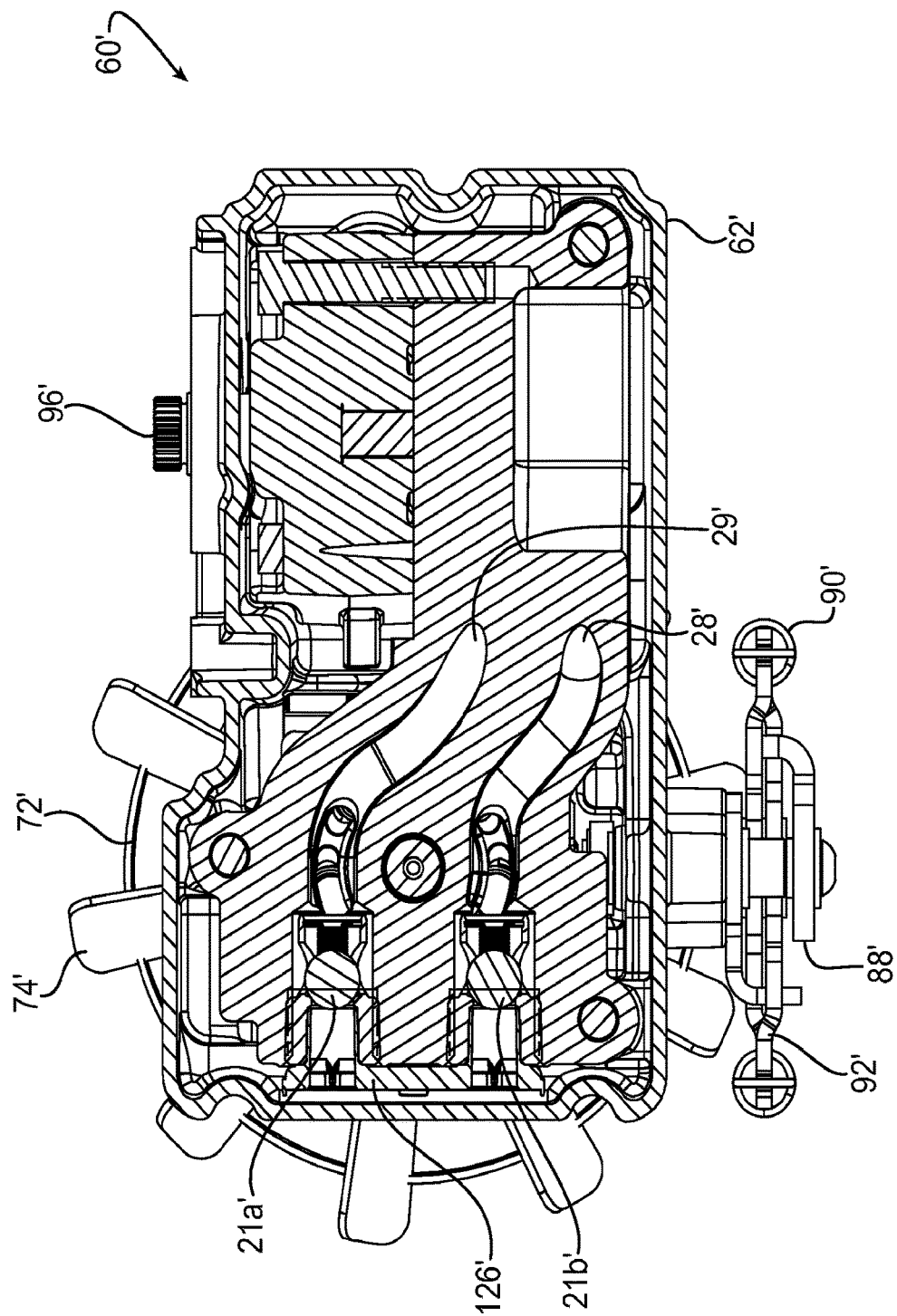
FIG. 29 is a drawing depicting a bottom cross-sectional view of the exemplary left side hydrostatic transmission along the line 29-29 of FIG. 26.

FIGS. 22 and 23 are drawings depicting two perspective views from different viewpoints of an exemplary left side hydrostatic transmission 60'. FIG. 24 is a drawing depicting a top view of the exemplary left side hydrostatic transmission. FIG. 24 is utilized as a reference figure for generating a cross-sectional view of the left side hydrostatic transmission. In particular, FIG. 25 is a drawing depicting a cross-sectional view of the left side hydrostatic transmission along the line 25-25 of FIG. 24. FIG. 26 is a drawing depicting a side view on an output shaft side of the exemplary left side hydrostatic transmission. FIG. 26 is utilized as a reference figure for generating additional cross-sectional views of the left side hydrostatic transmission 60'. In particular, FIG. 27 is a drawing depicting a cross-sectional view of the left side hydrostatic transmission along the line 27-27 of FIG. 26. FIG. 28 is a drawing depicting a cross-sectional view of the left side hydrostatic transmission along the line 28-28 of FIG. 26. FIG. 29 is a drawing depicting a bottom cross-sectional view of the left side hydrostatic transmission along the line 29-29 of FIG. 26.

Comparing FIGS. 17 (right side) and FIG. 25 (left side), different positioning of the inner and outer rotors is shown. Comparably as in the right side, in the left side, the motor portion 42' includes a rotor set having a gerotor configuration with an inner rotor 114' with six rotor lobes, and an outer rotor 116' with seven rotor lobes. Kidney ports 25a' and 25b' between rotor lobes permit entry of hydraulic fluid into the motor portion, depending upon the operation of the control arm, to form the hydraulic circuit through the pump and the motor as described above. On the left side also, the eccentricity of the outer rotor 116' relative to the inner rotor 114' is such that the rotation axis of the outer rotor is positioned lower than the rotation axis of the inner rotor, and thus the output shaft. To achieve proper fluid flow on the left side, the location of the kidney port 25a' and 25b' is different as shown in FIG. 25 versus the right side as shown in FIG. 17.

The right and left side hydrostatic transmissions may be used in a zero-turning radius vehicle. In such a vehicle, as seen by comparing the right side and left side figures above, the hydrostatic transmissions are substantially mirror images of each other. The right side hydrostatic transmission is combined with a right side gear box assembly to drive the right wheel, and the left side hydrostatic transmission is combined with a left side gear box assembly to drive the left wheel. In a zero-turning radius vehicle, each combined transmission/gear box assembly has a single output connected to a driving wheel. Turning is accomplished by independent controlling the driving wheel speed of the right wheel versus the left wheel. The gearboxes may enclose a gear reduction assembly including one or more stages.

Figure 30:
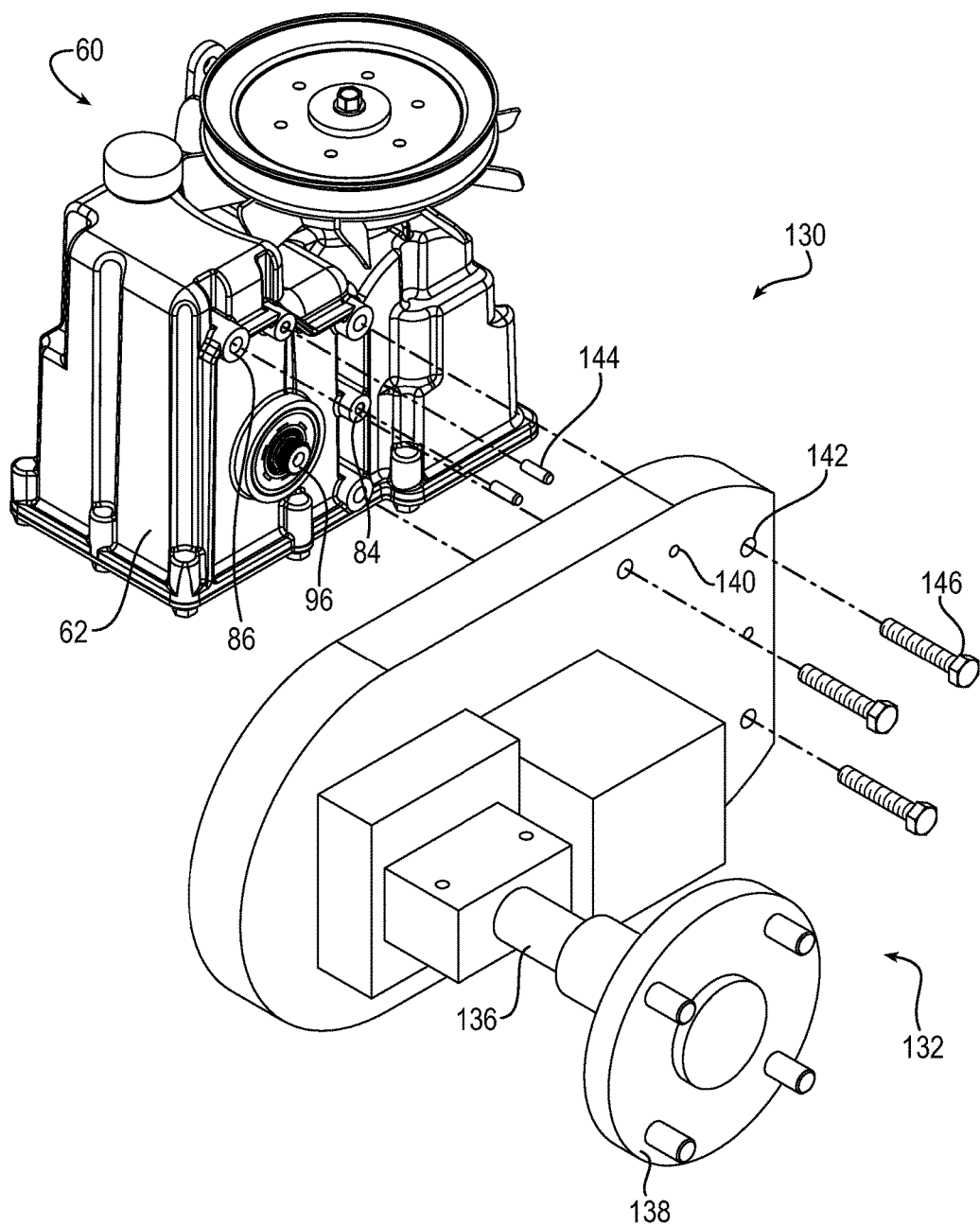
FIG. 30 is a drawing depicting an isometric and exploded view of an exemplary hydrostatic transmission/gear box assembly.

FIG. 30 is a drawing depicting an isometric and exploded view of an exemplary hydrostatic transmission/gear box assembly 130. The assembly 130 includes the hydrostatic transmission 60 attached to a gearbox unit 132. The gearbox unit 132 includes a mechanical speed reduction system attached to an axle 136 and drive wheel hub 138 for driving a vehicle wheel as are known in the art. As is known in the art, the mechanical speed reduction system may include an internal speed reducing gear set, which is driven by the rotation of the output shaft 96 of the hydrostatic transmission 60. As referenced above, on the output shaft side the hydrostatic transmission includes dowel holes 84 and fastener receiving heads 86. Complementary holes 140 and 142 are provided on the gearbox unit 132. Dowels 144 properly align the gearbox unit and the hydrostatic transmission, and fasteners 146 are used to attach the hydrostatic transmission to the gearbox unit via the referenced holes. The example of FIG. 30 depicts a right side hydrostatic transmission/gear box assembly. A gearbox in like manner may be attached to a left side transmission to form a left side hydrostatic transmission/gearbox assembly.

Figure 31:
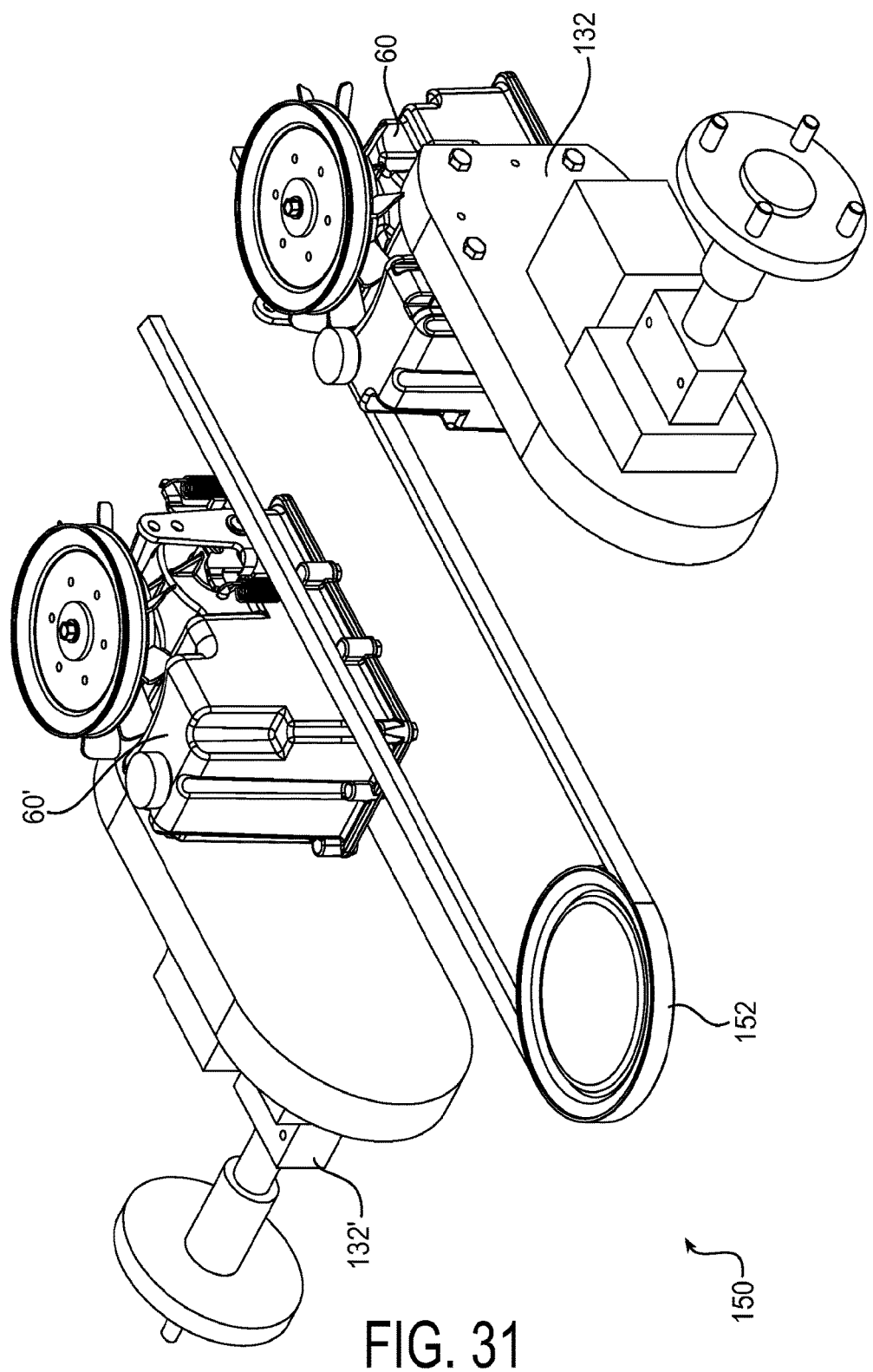
FIG. 31 is a drawing depicting an exemplary dual hydrostatic transmission system including right and left side hydrostatic transmissions and drop axles as positioned relative to a mower deck drive belt.
Figure 32:
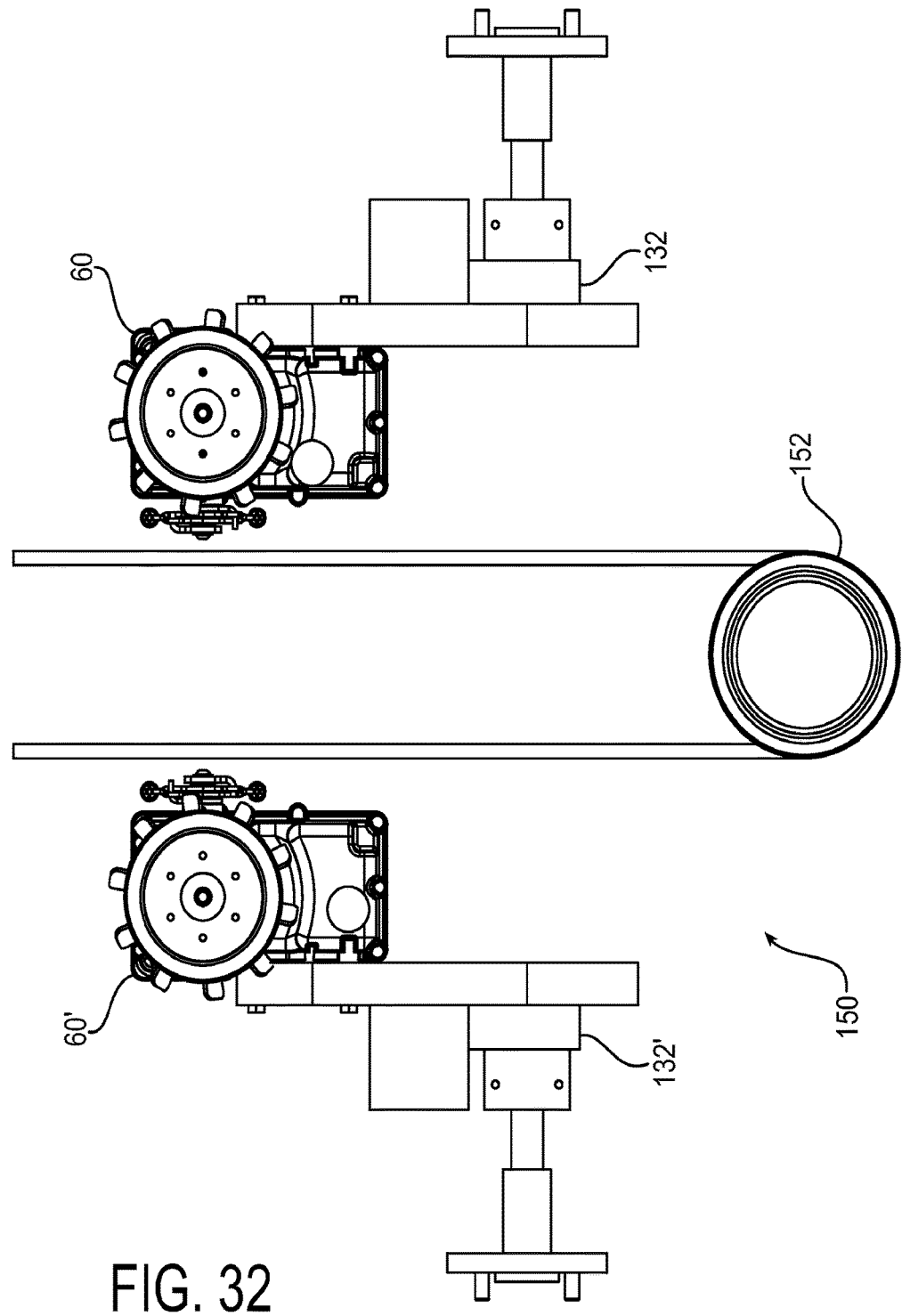
FIG. 32 is a drawing depicting a top view of the exemplary dual hydrostatic transmission system of FIG. 31.

FIG. 31 is a drawing depicting an exemplary dual hydrostatic transmission system 150. FIG. 32 is a drawing depicting a top view of the dual hydrostatic transmission system of FIG. 31. The dual hydrostatic transmission system 150 includes a first hydrostatic transmission 60 attached to a first gearbox unit 132, and a second hydrostatic transmission 60' attached to a second gearbox 132'. A traction drive belt (not shown) would connect a prime mover (such as for example an internal combustion engine) to the pulleys of the hydrostatic transmissions. A deck belt 152 runs between the first hydrostatic transmission and the second hydrostatic transmission. With such configuration, the lateral extent of the hydrostatic transmissions are minimized as compared to conventional configurations. In exemplary embodiments, the first hydrostatic transmission is a right side hydrostatic transmission 60 as described above, and the second hydrostatic transmission is a left side hydrostatic transmission 60' as described above. Accordingly, the center section of the right side hydrostatic transmission is mirror imaged and rotated 180° about horizontal and vertical axes relative to the center section of the left side hydrostatic transmission, and the motor of the right side hydrostatic transmission has a common configuration with the motor of the left side hydrostatic transmission. The right side hydrostatic transmission and the left side hydrostatic transmission have configurations that are substantially mirror images of each other.

Another type of vehicle configuration includes a modular hydrostatic transaxle system. In such a configuration, one of the described hydrostatic transmissions may be provided in a vehicle including a drive shaft with two outputs to the drive wheels, and a gear reduction. The hydrostatic transmission may transmit power from a prime mover to the drive axle for varying the wheel speeds. The drive axle may include a differential.

Figure 33:
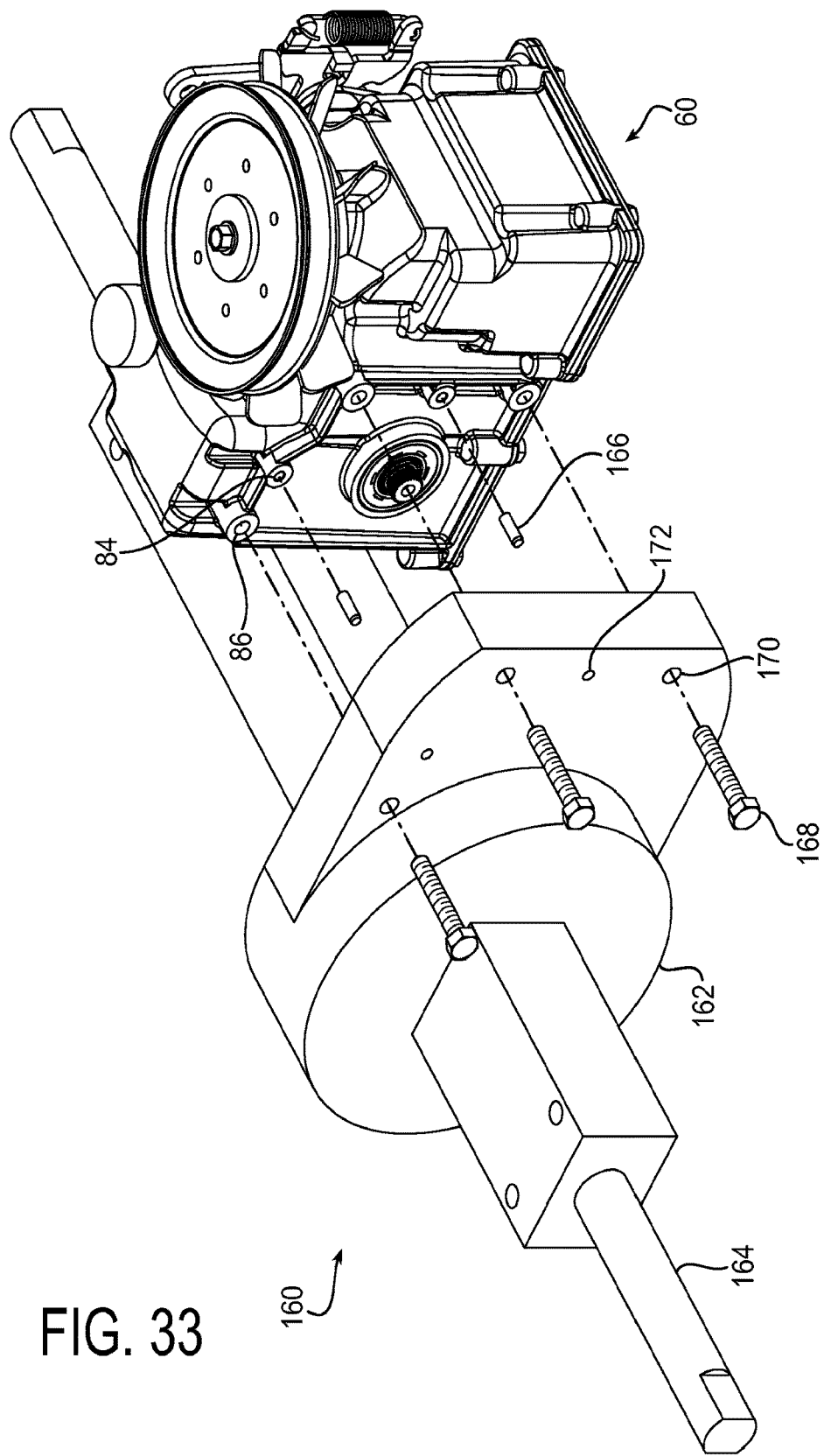
FIG. 33 is a drawing depicting an exemplary modular hydrostatic transaxle system including a hydrostatic transmission attached to a transaxle including a differential gearing system and an axle shaft.
Figure 34:
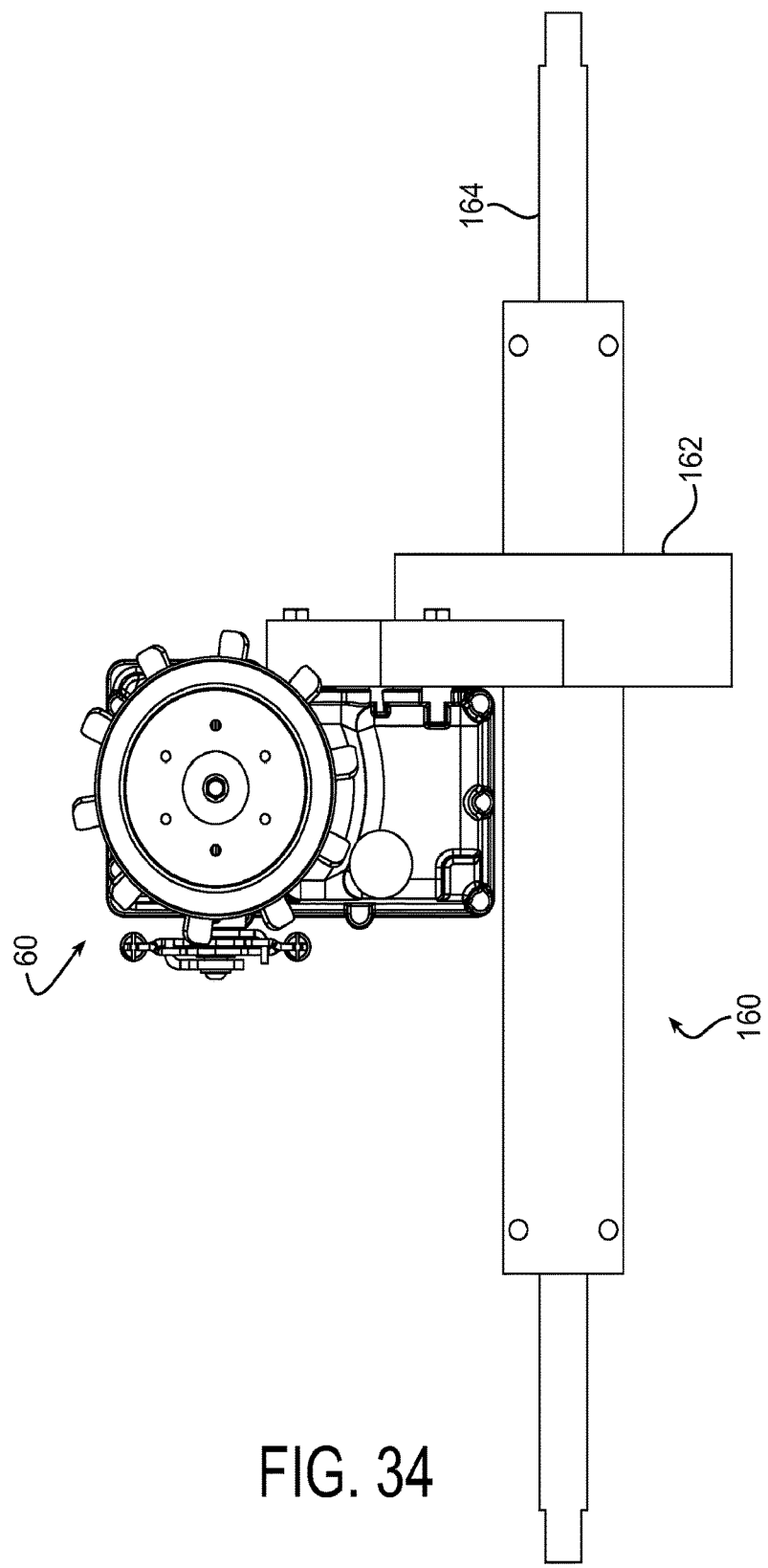
FIG. 34 is a drawing depicting a top view of the exemplary modular hydrostatic transaxle system of FIG. 33.

FIG. 33 is a drawing depicting an exploded isometric view of an exemplary modular hydrostatic transaxle system 160. FIG. 34 is a drawing depicting a top view of the exemplary modular hydrostatic transaxle system 160 of FIG. 33. The modular hydrostatic transaxle system 160 includes a single transmission 60 attached to a transaxle 162 including a differential gearing system and an axle shaft 164. The differential gearing system is driven to drive in turn the axle shaft 164 that is ultimately connected to the vehicle wheels, with one on each side. Similarly as described above, on the output shaft side the hydrostatic transmission includes dowel holes 84 and fastener receiving heads 86. Complementary through holes 170 and 172 are provided on the gearbox unit 162. Dowels 166 properly align the gearbox unit and the hydrostatic transmission, and fasteners 168 are used to attach the hydrostatic transmission to the transaxle 162 via the referenced holes.

In accordance with the above description, an aspect of the invention is a center section/motor sub-assembly for use in a hydrostatic transmission. In exemplary embodiments, the sub-assembly includes a center section having a pump running face for interfacing with a pump and a motor running face for interfacing with a motor, and a motor including a motor housing and an internal rotor set, wherein the motor housing is secured to the center section adjacent to the motor running face in a manner that permits rotation of the rotor set. The center section and the motor are configured for the hydraulic separating forces of the motor to be reacted only into the center section.

In an exemplary embodiment of the center section/motor sub-assembly, the center section forms a porting manifold for communicating hydraulic fluid to the motor. The porting manifold includes at least two internal passages between pump kidney ports on the pump running face and motor kidney ports on the motor running face, and the motor kidney ports are raised in elevation relative to the pump kidney ports.

In an exemplary embodiment of the center section/motor sub-assembly, the internal passages run parallel to each other as they rise in elevation between the pump kidney ports and the motor.

In an exemplary embodiment of the center section/motor sub-assembly, the pump running face is oriented 90° relative to the motor running face.

In an exemplary embodiment of the center section/motor sub-assembly, the rotor set has a gerotor configuration including an inner rotor and an outer rotor.

In an exemplary embodiment of the center section/motor sub-assembly, the sub-assembly further includes a press-in filter that is pressed into cylindrical bores in valves in the center section adjacent to the pump running face.

Another aspect of the invention is a hydrostatic transmission. In exemplary embodiments, the hydrostatic transmission includes a center section having a pump running face for interfacing with a pump and a motor running face for interfacing with a motor. A pump interfaces with the center section against the pump running face. A motor includes a motor housing and an internal rotor set, wherein the motor housing is secured to the center section adjacent to the motor running face in a manner that permits rotation of the rotor set. A top housing encloses the center section, pump, and motor. The center section and the motor are configured for the hydraulic separating forces of the motor to be reacted only into the center section and not the top housing.

In an exemplary embodiment of the hydrostatic transmission, the center section forms a porting manifold for communicating hydraulic fluid to the motor. The porting manifold includes at least two internal passages between pump kidney ports on the pump running face and motor kidney ports on the motor running face, and the motor kidney ports are raised in elevation relative to the pump kidney ports.

In an exemplary embodiment of the hydrostatic transmission, the internal passages run parallel to each other as they rise in elevation between the pump kidney ports and the motor.

In an exemplary embodiment of the hydrostatic transmission, the hydrostatic transmission further includes an output shaft assembly that extends through a bore in the top housing.

In an exemplary embodiment of the hydrostatic transmission, the output shaft assembly includes an output shaft having a first end that is positioned adjacent to the rotating element of the motor and support by a bearing in a motor bore, and a second end opposite the first end that extends outward from the top housing; a bearing that that is supported by the motor housing; a low profile retaining ring, wherein prior to installation of the output shaft assembly, the low profile ring retains a key for transmitting torque from the motor to the output shaft when installed; and a shaft seal that provides a seal between the output shaft and the bore of the housing.

In an exemplary embodiment of the hydrostatic transmission, for installation the output shaft assembly is configured as a separate component from a sub-assembly comprising the center section and the motor.

In an exemplary embodiment of the hydrostatic transmission, during installation the low profile retaining ring aligns the key for installation into the motor, and the low profile retaining ring slides off the key and becomes fit around the output shaft.

In an exemplary embodiment of the hydrostatic transmission, the hydrostatic transmission further includes a fluid reservoir within the top housing, wherein the top housing has an integral expansion volume into which the fluid in the reservoir can expand.

In an exemplary embodiment of the hydrostatic transmission, the center section further includes valve cavities for receiving hydraulic fluid, and each valve cavity has a check valve for controlling the flow of hydraulic fluid.

In an exemplary embodiment of the hydrostatic transmission, the hydrostatic transmission further includes a press-in filter that is pressed into cylindrical bores in the check valves.

In an exemplary embodiment of the hydrostatic transmission, the hydrostatic transmission further includes a control arm that varies displacement of the pump, and a return-to-neutral mechanism coupled to the control arm.

In an exemplary embodiment of the hydrostatic transmission, a back plate is secured to the top housing, and the back plate has a magnet adjacent to valve cavities of the center section for removing ferrous materials from the hydraulic fluid.

In an exemplary embodiment of the hydrostatic transmission, the pump running face is oriented 90° relative to the motor running face.

In an exemplary embodiment of the hydrostatic transmission, the rotor set has a gerotor configuration comprising an inner rotor and an outer rotor.

In an exemplary embodiment of the hydrostatic transmission, the hydrostatic transmission further includes a bleed hole through the center section.

Another aspect of the invention is a dual hydrostatic transmission system. Exemplary embodiments of the dual hydrostatic transmission system include a first hydrostatic transmission attached to a first gearbox unit, a second hydrostatic transmission attached to a second gearbox unit, and a belt that runs between the first hydrostatic transmission and the second hydrostatic transmission.

In an exemplary embodiment of the dual hydrostatic transmission system, the first hydrostatic transmission is a right side hydrostatic transmission, and the second hydrostatic transmission is a left side hydrostatic transmission. The center section of the right side hydrostatic transmission is rotated 180° about horizontal and vertical axes relative to the center section of the left side hydrostatic transmission.

In an exemplary embodiment of the hydrostatic transmission, the motor of the right side hydrostatic transmission has a common configuration with the motor of the left side hydrostatic transmission.

In an exemplary embodiment of the hydrostatic transmission, the right side hydrostatic transmission and the left side hydrostatic transmission have configurations that are substantially mirror images of each other.

Another aspect of the invention is a modular hydrostatic transaxle system. Exemplary embodiments of the modular hydrostatic transaxle system includes a hydrostatic transmission attached to a transaxle including a differential gearing system and an axle shaft, wherein the hydrostatic transmission drives the transaxle.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A center section/motor sub-assembly for use in a hydrostatic transmission, the sub-assembly comprising:
   a center section having a pump running face for interfacing with a pump, and a motor running face for interfacing with a motor; and
   a motor including a motor housing and an internal rotor set, wherein the motor housing is secured to the center section adjacent to the motor running face in a manner that permits rotation of the rotor set; and
   a bearing supported by the motor housing;
   wherein:
   the center section forms an end cover for the motor housing to which the motor housing is secured, the end cover including the motor running face adjacent to the internal rotor set, and the motor running face having motor kidney ports that open into the motor housing;
   the center section forms a porting manifold for communicating hydraulic fluid to the motor;
   the porting manifold comprising at least two internal passages between pump kidney ports on the pump running face and motor kidney ports on the motor running face, and the motor kidney ports are raised in elevation relative to the pump kidney ports; and
   the internal passages run parallel to each other as they rise in elevation between the pump kidney ports and the motor; and
   wherein the center section forming the end cover and the porting manifold is a unitary member.

2. The center section/motor sub-assembly of claim 1, wherein the pump running face is oriented 90° relative to the motor running face.

3. The center section/motor sub-assembly of claim 1, wherein the internal rotor set has a gerotor configuration comprising an inner rotor and an outer rotor.

4. The center section/motor sub-assembly of claim 1, further comprising a press-in filter that is pressed into cylindrical bores in valve cavities in the center section adjacent to the pump running face.

5. The center section/motor sub-assembly of claim 1, wherein the end cover is oriented vertically such that the motor running face is oriented vertically and oriented 90° relative to the pump running face; and
   wherein the end cover includes horizontally extending fastening receivers that receive corresponding fastening elements that secure the motor housing horizontally to the end cover such that the motor running face is adjacent to the internal rotor set.

6. A hydrostatic transmission comprising:
   a center section having a pump running face for interfacing with a pump, and a motor running face for interfacing with a motor;
   a pump that interfaces with the center section against the pump running face;
   a motor including a motor housing and an internal rotor set, wherein the motor housing is secured to the center section adjacent to the motor running face in a manner that permits rotation of the rotor set;
   a bearing supported by the motor housing; and
   a top housing that encloses the center section, pump, and motor;
   wherein:
   the center section forms an end cover for the motor housing to which the motor housing is secured, the end cover including the motor running face adjacent to the internal rotor set, and the motor running face having motor kidney ports that open into the motor housing;
   the center section forms a porting manifold for communicating hydraulic fluid to the motor;
   the porting manifold comprising at least two internal passages between pump kidney ports on the pump running face and motor kidney ports on the motor running face, and the motor kidney ports are raised in elevation relative to the pump kidney ports; and
   the internal passages run parallel to each other as they rise in elevation between the pump kidney ports and the motor; and
   wherein the center section forming the end cover and the porting manifold is a unitary member.

7. The hydrostatic transmission of claim 6, further comprising an output shaft assembly that extends through a bore in the top housing.

8. The hydrostatic transmission of claim 7, wherein the output shaft assembly comprises:
   an output shaft having a first end that is positioned adjacent to the rotor element of the motor, and a second end opposite the first end that extends outward from the top housing;
   another bearing that is supported by the motor housing;
   a low profile retaining ring, wherein prior to installation of the output shaft assembly, the low profile ring retains a key for transmitting torque from the motor to the output shaft when installed; and
   a shaft seal that provides a seal between the output shaft and the bore of the housing.

9. The hydrostatic transmission of claim 8, wherein for installation the output shaft assembly is configured as a separate component from a sub-assembly comprising the center section and the motor.

10. The hydrostatic transmission of claim 8, wherein during installation the low profile retaining ring aligns the key for installation into the motor, and the low profile retaining ring slides off the key and becomes fit around the output shaft.

11. The hydrostatic transmission of claim 6, further comprising a fluid reservoir within the top housing, wherein the top housing has an integral expansion volume into which the fluid in the reservoir can expand.

12. The hydrostatic transmission of claim 6, wherein the center section further comprises valve cavities for receiving hydraulic fluid, and each valve cavity has a check valve for controlling the flow of hydraulic fluid.

13. The hydrostatic transmission of claim 12, further comprising a press-in filter that is pressed into cylindrical bores in the valve cavities.

14. The hydrostatic transmission of claim 6, further comprising:
a control arm that varies displacement of the pump; and
a return-to-neutral mechanism coupled to the control arm.

15. The hydrostatic transmission of claim 6, wherein a back plate is secured to the top housing, and the back plate has a magnet adjacent to valve cavities of the center section for removing ferrous materials from the hydraulic fluid.

16. The hydrostatic transmission of claim 6, wherein the pump running face is oriented 90° relative to the motor running face.

17. The hydrostatic transmission of claim 6, wherein the internal rotor set has a gerotor configuration comprising an inner rotor and an outer rotor.

18. The hydrostatic transmission of claim 6, further comprising an output shaft,
wherein the end cover further includes a bore hole that supports an end of the output shaft, and
the center section further comprising a bleed hole opposite the bore hole, the bleed hole extending through the center section and connecting with the bore hole.

19. A dual hydrostatic transmission system comprising:
a first hydrostatic transmission according to claim 6 attached to a first gearbox unit;
a second hydrostatic transmission according to claim 6 attached to a second gearbox unit; and
a belt that runs between the first hydrostatic transmission and the second hydrostatic transmission.

20. The dual hydrostatic transmission system of claim 19, wherein
the first hydrostatic transmission is a right side hydrostatic transmission; and
the second hydrostatic transmission is a left side hydrostatic transmission;
wherein the center section of the right side hydrostatic transmission is rotated 180° about horizontal and vertical axes relative to the center section of the left side hydrostatic transmission.

21. The dual hydrostatic transmission system of claim 20, wherein the right side hydrostatic transmission and the left side hydrostatic transmission have configurations that are substantially mirror images of each other.

22. A modular hydrostatic transaxle system comprising:
a hydrostatic transmission according to claim 6 attached to a transaxle including a differential gearing system and an axle shaft.

23. The hydrostatic transmission of claim 6, wherein the end cover is oriented vertically such that the motor running face is oriented vertically and oriented 90° relative to the pump running face; and
wherein the end cover includes horizontally extending fastening receivers that receive corresponding fastening elements that secure the motor housing horizontally to the end cover such that the motor running face is adjacent to the internal rotor set.

* * * * *